(12) United States Patent
Takayama et al.

(10) Patent No.: US 8,158,491 B2
(45) Date of Patent: Apr. 17, 2012

(54) IC CARD AND BOOKING-ACCOUNT SYSTEM USING THE IC CARD

(75) Inventors: Toru Takayama, Atsugi (JP); Junya Maruyama, Ebina (JP); Yuugo Goto, Atsugi (JP); Yumiko Ohno, Atsugi (JP); Mai Akiba, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 12/979,052

(22) Filed: Dec. 27, 2010

(65) Prior Publication Data

US 2011/0092025 A1 Apr. 21, 2011

Related U.S. Application Data

(63) Continuation of application No. 12/652,910, filed on Jan. 6, 2010, now Pat. No. 7,863,116, and a continuation of application No. 10/733,260, filed on Dec. 12, 2003, now Pat. No. 7,652,359.

(30) Foreign Application Priority Data

Dec. 27, 2002 (JP) ................................. 2002-378803

(51) Int. Cl.
*H01L 21/30* (2006.01)
(52) U.S. Cl. ............ 438/458; 438/85; 438/118; 438/149
(58) Field of Classification Search .................. 438/455, 438/458, 459
See application file for complete search history.

(56) References Cited

U.S. PATENT DOCUMENTS

| 4,238,848 A | 12/1980 | Yamaguchi et al. |
| 4,472,627 A | 9/1984 | Weinberger |
| 4,536,014 A | 8/1985 | Boutaleb et al. |
| 4,614,861 A | 9/1986 | Pavlov et al. |

(Continued)

FOREIGN PATENT DOCUMENTS

CN 1302418 7/2001

(Continued)

OTHER PUBLICATIONS

European Search Report dated Jun. 29, 2004 for EP 03 029 235.

(Continued)

*Primary Examiner* — David Vu
*Assistant Examiner* — Earl Taylor
(74) *Attorney, Agent, or Firm* — Eric J. Robinson; Robinson Intellectual Property Law Office, P.C.

(57) ABSTRACT

It is an object of the present invention to provide a highly sophisticated functional IC card that can ensure security by preventing forgery such as changing a picture of a face, and display other images as well as the picture of a face. An IC card comprising a display device and a plurality of thin film integrated circuits; wherein driving of the display device is controlled by the plurality of thin film integrated circuits; a semiconductor element used for the plurality of thin film integrated circuits and the display device is formed by using a polycrystalline semiconductor film; the plurality of thin film integrated circuits are laminated; the display device and the plurality of thin film integrated circuits are equipped for the same printed wiring board; and the IC card has a thickness of from 0.05 mm to 1 mm.

23 Claims, 14 Drawing Sheets

U.S. PATENT DOCUMENTS

| | | | |
|---|---|---|---|
| 4,667,087 A | 5/1987 | Quintana | |
| 4,709,991 A | 12/1987 | Hoshikawa | |
| 4,709,995 A | 12/1987 | Kuribayashi et al. | |
| 4,746,787 A | 5/1988 | Suto et al. | |
| 4,754,418 A | 6/1988 | Hara | |
| 4,827,111 A | 5/1989 | Kondo | |
| 4,876,441 A | 10/1989 | Hara et al. | |
| 4,918,631 A | 4/1990 | Hara et al. | |
| 4,931,623 A | 6/1990 | Nakamura et al. | |
| 4,954,985 A | 9/1990 | Yamazaki | |
| 5,148,301 A | 9/1992 | Sawatsubashi et al. | |
| 5,276,311 A | 1/1994 | Hennige | |
| 5,412,192 A | 5/1995 | Hoss | |
| 5,436,744 A | 7/1995 | Arledge et al. | |
| 5,567,967 A | 10/1996 | Kusumoto | |
| 5,624,861 A | 4/1997 | Shibuya | |
| 5,643,826 A | 7/1997 | Ohtani et al. | |
| 5,656,511 A | 8/1997 | Shindo | |
| 5,693,956 A | 12/1997 | Shi et al. | |
| 5,703,755 A | 12/1997 | Flesher et al. | |
| 5,705,829 A | 1/1998 | Miyanaga et al. | |
| 5,737,272 A | 4/1998 | Uchiyama et al. | |
| 5,789,732 A | 8/1998 | McMahon et al. | |
| 5,830,785 A | 11/1998 | Sanson et al. | |
| 5,834,071 A | 11/1998 | Lin | |
| 5,834,327 A | 11/1998 | Yamazaki et al. | |
| 5,923,962 A | 7/1999 | Ohtani et al. | |
| 6,002,605 A | 12/1999 | Iwasaki et al. | |
| 6,012,636 A | 1/2000 | Smith | |
| 6,019,284 A | 2/2000 | Freeman et al. | |
| 6,027,958 A | 2/2000 | Vu et al. | |
| 6,028,926 A | 2/2000 | Henderson et al. | |
| 6,061,246 A | 5/2000 | Oh et al. | |
| 6,064,988 A | 5/2000 | Thomas | |
| 6,191,838 B1 | 2/2001 | Muramatsu | |
| 6,300,152 B1 | 10/2001 | Kim | |
| 6,319,827 B1 | 11/2001 | Kowalski et al. | |
| 6,321,067 B1 | 11/2001 | Suga et al. | |
| 6,360,954 B1 | 3/2002 | Barnardo | |
| 6,391,747 B1 | 5/2002 | Okumura et al. | |
| 6,392,354 B1 | 5/2002 | Matsueda | |
| 6,402,039 B1 | 6/2002 | Freeman et al. | |
| 6,414,441 B1 | 7/2002 | Fries et al. | |
| 6,456,353 B1 | 9/2002 | Chen | |
| 6,491,229 B1 | 12/2002 | Berney | |
| 6,518,557 B1 | 2/2003 | Izumi et al. | |
| 6,583,776 B2 | 6/2003 | Yamazaki et al. | |
| 6,613,610 B2 | 9/2003 | Iwafuchi et al. | |
| 6,616,035 B2 | 9/2003 | Ehrensvard et al. | |
| 6,628,043 B2 | 9/2003 | Furukawa et al. | |
| 6,675,470 B2 | 1/2004 | Muramatsu | |
| 6,677,171 B1 | 1/2004 | Nagata et al. | |
| 6,717,249 B2 | 4/2004 | Akagawa | |
| 6,760,090 B2 | 7/2004 | Cho | |
| 6,765,813 B2 | 7/2004 | Scheuerlein et al. | |
| 6,771,239 B1 | 8/2004 | Uchiyama | |
| 6,814,832 B2 | 11/2004 | Utsunomiya | |
| 6,850,307 B2 | 2/2005 | Hinata | |
| 6,859,195 B2 | 2/2005 | Kodate | |
| 6,893,887 B2 | 5/2005 | Yamagata et al. | |
| 6,924,781 B1 | 8/2005 | Gelbman | |
| 6,933,086 B2 | 8/2005 | Sakurada | |
| 6,961,111 B1 | 11/2005 | Kuramasu | |
| 6,972,204 B2 | 12/2005 | Oohata et al. | |
| 6,998,287 B2 | 2/2006 | Lee | |
| 7,060,153 B2 | 6/2006 | Yamazaki et al. | |
| 7,072,018 B2 | 7/2006 | Yamamura et al. | |
| 7,088,328 B2 | 8/2006 | Inada et al. | |
| 7,105,365 B2 | 9/2006 | Hiroki et al. | |
| 7,112,115 B1 | 9/2006 | Yamazaki et al. | |
| 7,123,230 B2 | 10/2006 | Park et al. | |
| 7,147,740 B2 | 12/2006 | Takayama et al. | |
| 7,158,031 B2 | 1/2007 | Tuttle | |
| 7,163,153 B2 | 1/2007 | Blossom | |
| 7,235,466 B2 | 6/2007 | I-Chang | |
| 7,239,564 B2 | 7/2007 | Mutaguchi | |
| 7,255,899 B2 | 8/2007 | Kusuda | |
| 7,332,381 B2 | 2/2008 | Maruyama et al. | |
| 7,351,300 B2 | 4/2008 | Takayama et al. | |
| 7,440,771 B2 | 10/2008 | Purk | |
| 7,459,779 B2 | 12/2008 | Chung et al. | |
| 7,518,692 B2 | 4/2009 | Yamazaki et al. | |
| 7,566,001 B2 | 7/2009 | Yamazaki | |
| 7,700,958 B2 | 4/2010 | Nishi et al. | |
| 7,804,552 B2 | 9/2010 | Yamazaki et al. | |
| 2001/0015256 A1 | 8/2001 | Yamazaki et al. | |
| 2002/0159010 A1 | 10/2002 | Maeda et al. | |
| 2003/0082889 A1 | 5/2003 | Maruyama et al. | |
| 2003/0207593 A1* | 11/2003 | Derderian et al. | 438/778 |
| 2004/0088855 A1* | 5/2004 | Akram | 29/840 |
| 2004/0090829 A1 | 5/2004 | Miura et al. | |
| 2004/0099926 A1* | 5/2004 | Yamazaki et al. | 257/632 |
| 2004/0112857 A1* | 6/2004 | Herschbein et al. | 216/21 |

FOREIGN PATENT DOCUMENTS

| | | |
|---|---|---|
| EP | 0 073 603 | 3/1983 |
| EP | 0 291 259 | 11/1988 |
| JP | 56-014369 | 2/1981 |
| JP | 59-022961 | 2/1984 |
| JP | 61-177586 | 8/1986 |
| JP | 01-027998 | 1/1989 |
| JP | 02-007105 | 2/1990 |
| JP | 04-025497 | 1/1992 |
| JP | 07-052589 | 2/1995 |
| JP | 07-130652 | 5/1995 |
| JP | 07-146922 | 6/1995 |
| JP | 09-051020 | 2/1997 |
| JP | 09-064364 | 3/1997 |
| JP | 09-506738 | 6/1997 |
| JP | 09-311921 | 12/1997 |
| JP | 09-311922 | 12/1997 |
| JP | 11-020360 | 1/1999 |
| JP | 11-120312 | 4/1999 |
| JP | 11-250215 | 9/1999 |
| JP | 2000-020665 | 1/2000 |
| JP | 2000-514937 | 11/2000 |
| JP | 2001-100684 | 4/2001 |
| JP | 2001-306967 | 11/2001 |
| JP | 2002-366059 | 12/2002 |
| WO | WO 98/02921 | 1/1998 |
| WO | WO 01/09954 | 2/2001 |
| WO | WO 02-069251 | 9/2002 |
| WO | WO 03/030096 | 4/2003 |

OTHER PUBLICATIONS

Jingyuan et al., *Producing Technology of Polysilicon Micro Machine Film*, J. Sensor & Transducer Techno., No. 6, Jan. 1, 1993, pp. 38-39 and 55.

Office Action (Application No. 200310123564.6) dated May 25, 2007.

Office Action (Application No. 200310123568.4) dated Nov. 24, 2006.

Office Action (Application No. 200310123568.4) dated May 25, 2007.

Korean Office Action (Application No. 2003-0093569) dated Aug. 10, 2010.

European Office Action (Application No. 03029235.3) Dated Feb. 1, 2012.

* cited by examiner

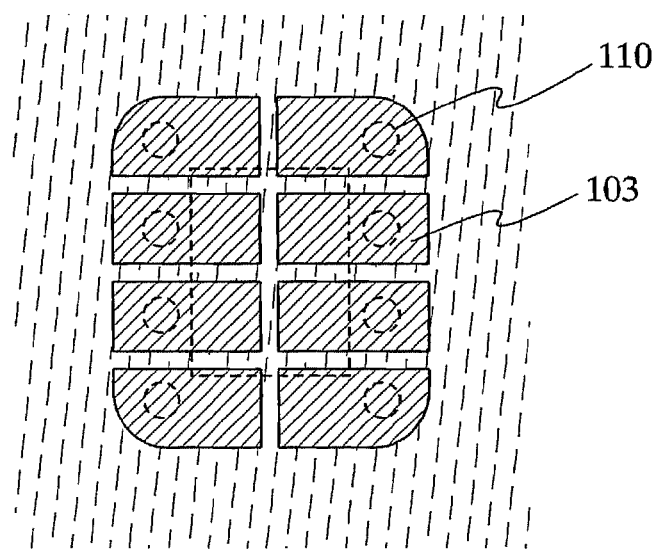
FIG. 2A
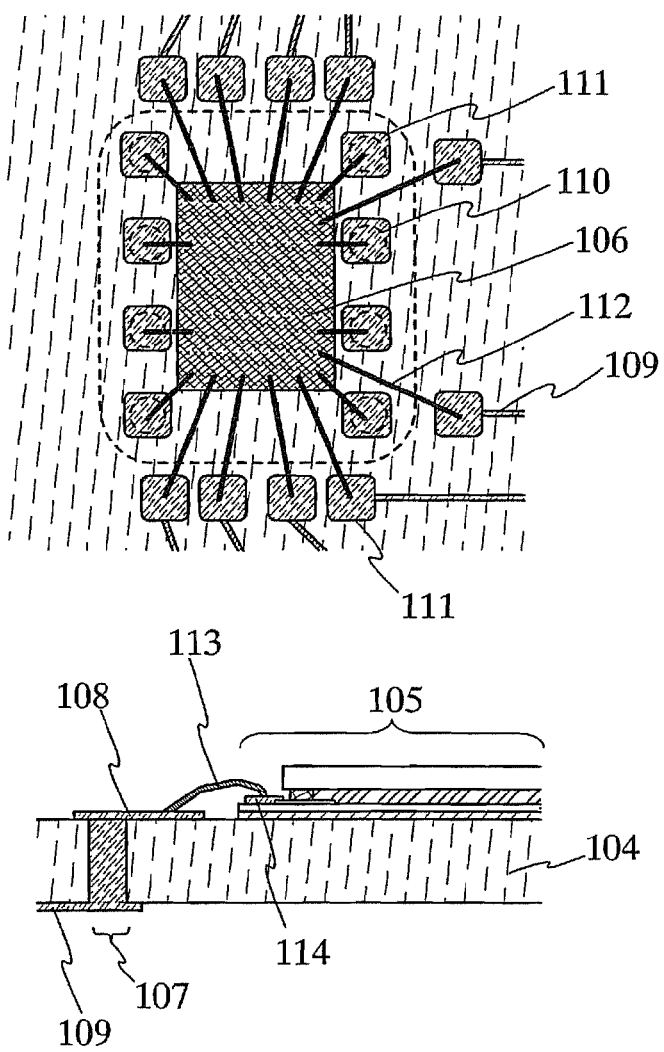
FIG. 2B
FIG. 2C

IC CARD AND BOOKING-ACCOUNT SYSTEM USING THE IC CARD

CROSS REFERENCE TO RELATED APPLICATIONS

Continuation of application Ser. No. 12/652,910, filed on Jan. 6, 2010, now U.S. Pat. No. 7,863,116, Continuation of application Ser. No. 10/733,260, filed on Dec. 12, 2003, now U.S. Pat. No. 7,652,359.

BACKGROUND OF THE INVENTION

1. Field of the Invention

The present invention relates to an IC card (which is also called a smart card) incorporating an integrated circuit such as a memory or a microprocessor (CPU). Further, the present invention relates to an booking-account system of a dealing content in the case of using the IC card as an ATM (automated teller machine) card (which is also called a cash card).

2. Description of the Related Art

Several ten bytes of data only can be memorized in a magnetic card that can memorize data magnetically. However, an IC card incorporating a semiconductor memory, normally, can memorize about 5 KB of data or more. The IC card can assure much more capacity than a magnetic card. Further, the IC card has merits as follows: the IC card does not have a risk that data is read out by a physical means such as putting iron sand on a card, different from a magnetic card, and that data memorized in the IC card is not easily falsified.

In recent years, an IC card has a highly sophisticated function by being provided with a CPU as well as a memory. The application thereof is wide-ranging, for example, an IC card is applied to an ATM card, a credit cart, a prepaid card, a patient's registration card, an identity card such as a student card or an employee ID card, a season ticket, a membership card, etc. As an example of the highly sophisticated function, an IC card for which a display device that can display simple characters and numbers is provided and for which a keyboard to input numbers is provided is described in the reference 1 (Reference 1: Japanese Examined Patent As described in the Reference 1, a new use becomes possible by adding a new function to an ID card. Nowadays, electronic commerce, teleworking, remote medical care, remote education, computerized administrative services, automatic toll revenue from an expressway, image distribution service and the like using an IC card are to be put to a practical use and it is considered that an IC card will be used in a wider field in the future.

As an IC card is used more widely, a misapplication of an IC card becomes a bigger problem measurably. A future issue is how securely identification is performed when an IC card is used.

Printing a picture of a face in an IC card is one of measures for preventing a misapplication of an IC card. It is possible, by printing a picture of a face, that a third person can identify a person to be identified with a visual recognition when the person uses his/her IC card, if such identification is not performed in an unattended terminal operation such as ATM. A misapplication can be prevented efficiently in the case where a security camera that can take a picture of a user's face at close range is not provided.

However, in general, a picture of a face is transferred to an IC card by a printing method, and thus there is a pitfall that the picture of a face is easily changed by forgery.

The thickness of an IC card is generally 0.7 mm and the card is thin. Thus, it is necessary to provide a larger number of integrated circuits having a larger circuit scale or a larger memory capacity within the limited area for sake of high-functionality when the area on which the integrated circuit is provided is limited.

SUMMARY OF THE INVENTION

It is an object of the present invention to provide a highly sophisticated functional IC card that can ensure security by preventing forgery such as changing a picture of a face, and that can display other images as well as a picture of a face.

According to the present invention, a display device which is thin enough to be accommodated within an IC card is equipped for the IC card. Specifically, an integrated circuit and a display device are manufactured by a method described hereinafter.

A metal film is formed over a first substrate and a surface of the metal film is oxidized to form an ultrathin metal oxide film of several nm in thickness. An insulating film and a semiconductor film are laminated on the metal oxide film sequentially. A semiconductor element to be used for an integrated circuit or a display device is manufactured by using the semiconductor film. In this specification, the integrated circuit used in the present invention is referred to as a thin film integrated circuit hereinafter, for the purpose of distinguishing the integrated circuit from an integrated circuit formed by using an existing silicon wafer. The semiconductor element is formed, and then, a second substrate is bonded so as to cover the element, thereby forming a state in which the semiconductor element is sandwiched between the first substrate and the second substrate.

A third substrate is bonded to the opposite side of the semiconductor element in the first substrate in order to enhance rigidity of the first substrate. When the rigidity of the first substrate is higher than that of the second substrate, the first substrate can be peeled off smoothly with fewer damages to the semiconductor element. However, the third substrate is not always required to be bonded to the first substrate as long as the rigidity of the first substrate is high enough when the first substrate is peeled off from the semiconductor element in a later process.

The metal oxide film is crystallized by a heat treatment or the like to enhance brittleness thereof and make peeling of the substrate from the semiconductor element easy. The first substrate and the third substrate are together peeled off from the semiconductor element. The heat treatment for crystallizing the metal oxide film may be performed before bonding the third substrate or before bonding the second substrate. Alternatively, a heat treatment performed in a process of forming a semiconductor element may also serve as the process for crystallizing the metal oxide film.

Three separated portions results from the peeling, that is, the portion in which the metal film is separated from the metal oxide film, the portion in which the insulating film is separated from the metal oxide film, or the portion in which the metal oxide film is separated to two sides itself. In any case, the semiconductor element is peeled off from the first substrate so that the semiconductor element can be bonded to the second substrate.

After the first substrate is peeled off, the semiconductor element is mounted over a printed wiring board or an interposer to peel the second substrate off. Note that, the second substrate is not always required to be peeled off, when the thickness of the second substrate does not matter. At the time, the semiconductor element to which the second substrate is bonded may be complete.

A display element of a display device is manufactured after mounting the semiconductor element over a printed wiring board or an interposer. Specifically, in the case of a liquid crystal display device, a pixel electrode of a liquid crystal cell electrically connected to a TFT that is one of semiconductor elements or an alignment film covering the pixel electrode is formed and then, the semiconductor element, the pixel electrode, and the alignment film are mounted over the printed wiring board or the interposer. After that, an opposite substrate that was manufactured separately is bonded to the pixel electrode and the alignment film and a liquid crystal is injected to complete the liquid crystal display device.

After the first substrate is peeled off, the semiconductor element may be bonded to another substrate that becomes a base of the display device, instead of bonding to the printed wiring board or the interposer. After the display element is provided for the display device to complete the display device, the display device may be mounted over the printed wiring board or the interposer together with the substrate that becomes a base. In this case, peeling of the second substrate is performed before mounting. Preferably, the thickness of the substrate serving as a base is set to be thin enough not to prevent an IC card from becoming thinner, specifically, to be several hundred μm or less.

An electrical connection (bonding) between the display device or the thin film integrated circuit formed by using the semiconductor element and the printed wiring board or the interposer may be performed by a flip chip method, TAB (Tape Automated Bonding) method, or a wire-bonding method. When the flip chip method is employed, bonding and mounting are performed at the same time. When a wire-bonding method is employed, the bonding process is performed in a state in which the second substrate is peeled off after mounting.

When a plurality of thin film integrated circuits or display devices is formed on a substrate, dicing is performed halfway to separate the thin film integrated circuit or the display device. The timing for dicing is different depending on whether a packaging of the thin film integrated circuit is or not, or whether the substrate of the display device serving as a base is or not. In any case, the dicing is performed before the thin film integrated circuit or the display device is mounted or equipped for the printed wiring board.

When the thin film integrated circuit is packaged, a plurality of thin film integrated circuits is mounted on the same interposer to be used as a MCP. In this case, a wire-bonding method for electrical connection between thin film integrated circuits or a flip chip method may be employed.

The interposer may be connected electrically to a printed wiring board by a lead frame or by a bump. Or the interposer may have another known form.

According to the present invention, an ultrathin film integrated circuit having a total thickness of from 1 μm through 5 μm, typically, 2 μm can be formed by using a thin semiconductor film having a film thickness of 500 nm or less, although an integrated circuit formed using a silicon wafer has a thickness of about 50 μm. The thickness of a display device can be set to about 0.5 mm, preferably, about 0.02 mm. Accordingly, it is possible to provide a display device for an IC card having a thickness of from 0.05 mm through 1 mm. It is also possible to provide a larger number of thin film integrated circuits having a larger circuit scale or a larger memory capacity within the limited area, thereby realizing multi-functionality of the IC card without preventing miniaturization and weight saving of the IC card.

According to the present invention, a glass substrate that is less expensive and larger than a silicon wafer can be used, and thus, thin film integrated circuits can be mass-produced at low cost and with high throughput. As a result, a manufacturing cost can be reduced dramatically. Further, it is possible to use a substrate repeatedly, thereby reducing the cost.

The thin film integrated circuit does not need a back-grinding process, different from an integrated circuit formed by using a silicon wafer. The back-grinding process results in a crack or a grinding mark. Unevenness of the thickness depends on unevenness of each film making up a thin film integrated circuit in a film forming process, and thus, at most several hundred nm of unevenness can be seen. The unevenness can be suppressed dramatically, as compared with the unevenness of several to several tens μm due to the back-grinding process.

A thin film integrated circuit or a display device can be bonded in accordance with a shape of a printed wiring board, and thus, there is a lot of flexibility for a shape of an IC card. Therefore, for example, it is possible to form an IC card into a shape having a curved surface, which can be attached to a columnar bottle.

The thin film integrated circuit is not limited to a mode in which the thin film integrated circuit is directly equipped for a printed wiring board as a bare chip. The thin film integrated circuit can adopt a mode in which the thin film integrated circuit is mounted on an interposer, packaged and equipped. A smaller and lighter thin film integrated circuit can be obtained by being equipped a thin film integrated circuit as a bare chip. On the other hand, equipment can be performed easily by being equipped after packaging, without requiring a clean room or a special technology or facility such as a bonder when a thin film integrated circuit provided by a packaging manufacturer is equipped on an electronic device manufacturer side. The thin film integrated circuit can be protected from an external environment, standardization of a footprint of a printed wiring board can be realized, wirings of a thin film integrated circuit on a sub micron scale can be enlarged to almost the same millimeter scale as a printed wiring board.

The package can adopt various known modes such as DIP (Dual In-line Package), QFP (Quad Flat Package), SOP (Small Outline Package), or the like in addition to CSP (Chip Size Package), MCP (Multi Chip Package).

A liquid crystal display device, a light emitting device including a light emitting element typified by an organic light emitting element in each pixel, a DMD (Digital Micromirror Device), or the like can be employed as the display device. A microprocessor (CPU), a memory, a power source circuit, another digital circuit or analog circuit can be provided for the thin film integrated circuit. A driver circuit of the display device or a controller that generates a signal to be supplied to the driver circuit may be provided within the thin film integrated circuit.

The present invention is not limited to a card. The category of the present invention includes a portable recording medium that includes the thin film integrated circuit and the display device described above and that can transmit and receive data with a host.

BRIEF DESCRIPTION OF THE DRAWINGS

In the accompanying drawings:

FIGS. 2A to 2C are enlarged views of a connection terminal and a thin film integrated circuit and an enlarged view of a connection portion between a display device and a printed wiring board;

DETAILED DESCRIPTION OF THE PREFERRED EMBODIMENTS

Embodiment Mode

Figure 1A:
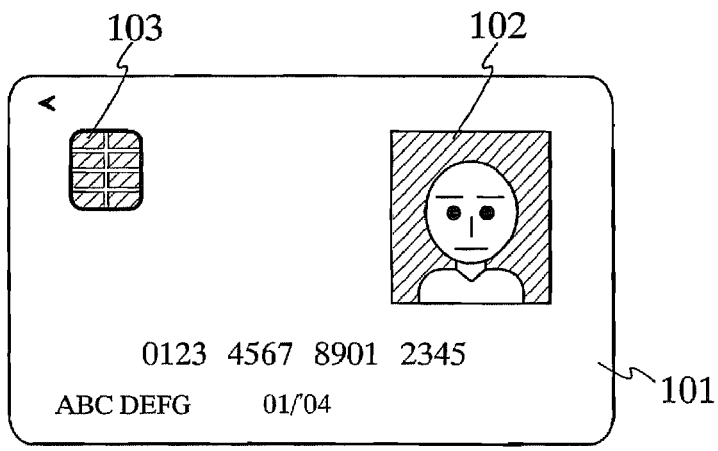
FIGS. 1A to 1C show an external view and an internal structure of an IC card according to the present invention.

FIG. 1A shows a top view of an IC card according to the present invention. The IC card shown in FIG. 1A is a contact type card for sending and receiving data by electrically connecting a connection terminal provided for the IC card to a reader/writer of terminal equipment. However, the IC card may be a noncontact type card for sending and receiving data without being connected.

Reference number 101 shows a card body. Reference number 102 corresponds to a pixel portion of a display device provided for the card body 101. Reference number 103 corresponds to a connection terminal of a thin film integrated circuit also provided for the card body 101.

Figure 1B:
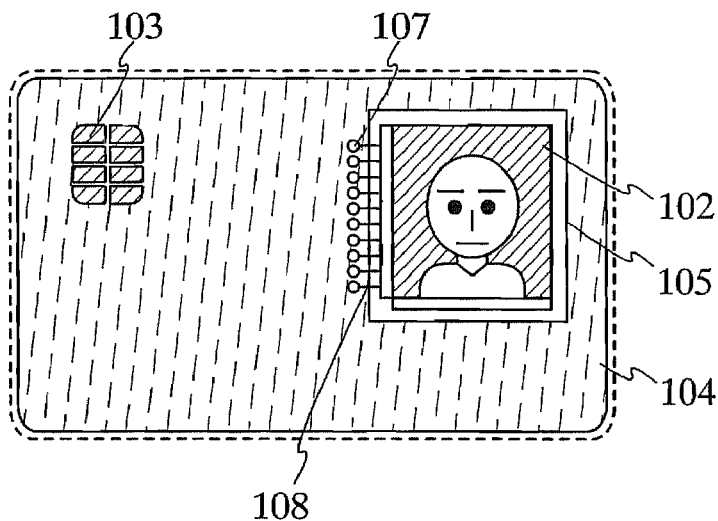
Figure 1C:
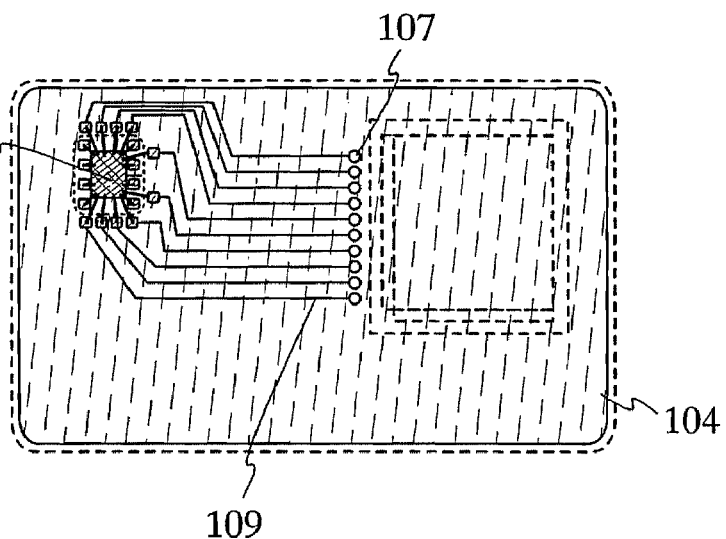

FIG. 1B shows a structure of a printed wiring board 104 sealed within the card body. FIG. 1C shows a backside structure of the printed wiring board 104 shown in FIG. 1B. A display device 105 is equipped for one side of the printed wiring board 104 and a thin film integrated circuit 106 is equipped for the other side thereof.

In the IC card shown in FIGS. 1A to 1C, the display device 105 and the thin film integrated circuit 106 are equipped for different sides of the printed wiring board 104. However, the both may be equipped for the same side. As shown in FIGS. 1A to 1C, when the display device 105 and the thin film integrated circuit 106 are equipped for different sides of the printed wiring board 104, a lead (wiring) 108 electrically connected to the display device 105 and a lead (wiring) 109 electrically connected to the thin film integrated circuit 106 are electrically connected to each other through a contact hole 107.

The connection terminal 103 is a terminal for sending and receiving data between the terminal equipment and the IC card by being directly connected to a reader/writer provided for the terminal equipment. FIG. 2A shows an enlarged view of the connection terminal 103 shown in FIG. 1B. FIG. 2B shows an enlarged view of the thin film integrated circuit 106 shown in FIG. 1C.

FIG. 2A shows an example in which eight connection terminals 103 are provided for one side of the printed wiring board 104. However, the number of the connection terminals is not limited thereto, of course. Further, as shown in FIG. 2B, multiple pads 111 are provided for the other side of the printed wiring board 104.

The pad 111 is electrically connected to the thin film integrated circuit 106 by a wire 112. The pad 111 is a pad that is electrically connected to the connection terminal 103 through a contact hole 110 provided for the printed wiring board 104, or a pad that is electrically connected to the lead 109. A pad 111 that is electrically connected to the connection terminal 103 or the lead 109, but that is not electrically connected to the thin film integrated circuit 106 without providing the wire 112 may be provided in some cases.

FIG. 2C shows a cross-sectional view of a portion in which the display device 105 and the lead 108 are connected to each other. As shown in FIG. 2C, a terminal 114 provided for the display device 105 and the lead 108 are electrically connected to each other by a wire 113, and the lead 108 is electrically connected to a lead 109 through the contact hole 107.

In this embodiment mode, the electrical connection between the pad 111 and the thin film integrated circuit 106 is made by a wire-bonding method. However, the present invention is not limited to the method. A flip chip bonding method using a solder ball or other method may be employed for the connection, and other methods may be employed for the electrical connection. The method for electrically connecting the display device 105 to the lead 108 is not limited to the wire-bonding method, and other methods may be employed for the electrical connection.

The electrical connection between the connection terminal 103 and the thin film integrated circuit 106 is not limited to the mode of the present embodiment mode. For example, the connection between the connection terminal and thin film integrated circuit may be conducted directly by a wire through a contact hole, without providing a pad.

A method for manufacturing a thin film integrated circuit is described, and then a method for manufacturing a display device is described. Note that, in this embodiment mode, although two TFTs are given as an example of a semiconductor element, the semiconductor element included in the thin film integrated circuit and the display device is not limited thereto, and various circuit elements can be used. For example, a memory element, a diode, a photoelectric transferring element, a resistor element, a coil, a capacitor element, or an inductor can be given as a representative example in addition to a TFT.

Figure 3A:
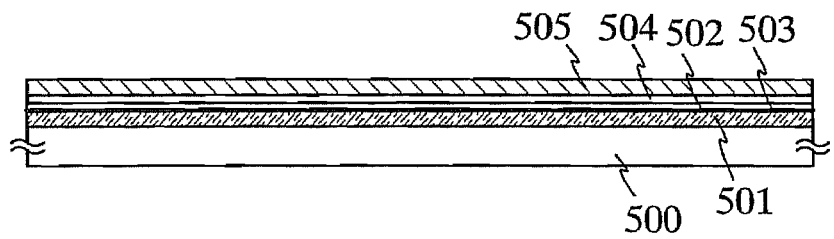
FIGS. 3A to 3E show a method for manufacturing a semiconductor element.

As shown in FIG. 3A, a metal film 501 is formed on a first substrate 500 by sputtering. The metal film 501 is formed of tungsten to be 10 nm to 200 nm, preferably 50 nm to 75 nm in thickness. In this embodiment mode, the metal film 501 is formed directly on the first substrate 500. However, the first substrate 500 may be covered with an insulating film such as a silicon oxide, a silicon nitride, a silicon nitride-oxide and then, the metal film 501 may be formed thereover.

After the metal film 501 is formed, an oxide film 502 is formed to be laminated over the metal film 501 without being exposed to air. A silicon oxide film is formed to be 150 nm to 300 nm in thickness as the oxide film 502. When the sputtering method is employed, an edge face of the first substrate 500 is also deposited. Therefore, preferably, the metal film 501 and the oxide film 502 deposited in the edge face are selectively removed by $O_2$ ashing or the like in order to prevent the oxide film 502 from remaining on the side of the first substrate 500 in a later process for peeling off.

When the oxide film 502 is formed, a pre-sputtering for generating plasma by blocking a target from a substrate with a shutter is conducted as a preliminary step toward sputtering. The pre-sputtering is conducted under conditions where the flow rates of Ar and $O_2$ are set to 10 sccm and 30 sccm, respectively, the temperature of the first substrate 500 is set to 270° C., and deposition power is kept 3 kW in an equilibrium situation. An ultrathin metal oxide film 503 of several nm (here, 3 nm) is formed between the metal film 501 and the oxide film 502. The surface of the metal film 501 is oxidized to form the metal oxide film 503. Accordingly, the metal oxide film 503 is made of tungstic oxide in this embodiment mode.

In this embodiment mode, the metal oxide film 503 is formed by the pre-sputtering. However, the present invention is not limited to the method. For example, the metal oxide film 503 may be formed by oxidizing deliberately the surface of the metal film 501 by plasma in the atmosphere of oxygen or oxygen added with inert gases such as Ar.

After forming the oxide film 502, a base film 504 is formed by PCVD. Here, a silicon oxynitride film is formed to have a thickness approximately of 100 nm as the base film 504. After forming the base film 504, a semiconductor film 505 is formed without being exposed to air. The semiconductor film 505 is formed to have a thickness of from 25 nm to 100 nm (preferably from 30 nm to 60 nm). The semiconductor film 505 may be an amorphous semiconductor or a polycrystalline semiconductor. Silicon germanium as well as silicon may be used for a semiconductor. In the case of using silicon germanium, the concentration thereof is preferably approximately from 0.01 atomic % to 4.5 atomic %.

Figure 3B:

As shown in FIG. 3B, the semiconductor film 505 is crystallized by a known technique. As known methods of crystallization, there are a thermal-crystallization method using an electric heater, a laser annealing crystallization method using a laser beam, and a lamp annealing crystallization method using an infrared ray. Alternatively, a crystallization method using a catalytic element may be conducted according to a technique described in Japanese Patent Laid Open No. H07-130652.

The semiconductor film 505 that is a polycrystalline semiconductor film may in advance be formed by a sputtering method, a plasma CVD method, a thermal CVD method, or the like.

In this embodiment mode, the semiconductor film 505 is crystallized by a laser crystallization. It is possible to obtain crystals having a large grain size by emitting a laser beam of second to fourth harmonics of a fundamental harmonic with a solid-state laser that is capable of continuously emitting. Typically, it is preferable to use second harmonic (532 nm) or third harmonic (355 nm) of Nd:YVO$_4$ laser (fundamental harmonic: 1064 nm). Specifically, a laser beam emitted from continuous wave type YVO$_4$ laser is converted to the harmonic with a non-linear optical element to obtain the output power of 10 W. Further, there is a method of emitting a harmonic with a non-linear optical element. Preferably, the laser beam is formed to have a rectangular shape or an elliptical shape in a surface to be irradiated by using an optical system. The semiconductor film 505 is irradiated with the above-described laser beam. On this occasion, an energy density of approximately from 0.01 MW/cm2 to 100 MW/cm$^2$ (preferably from 0.1 MW/cm$^2$ to 10 MW/cm$^2$) is necessary. The scanning speed thereof is set to approximately from 10 cm/s to 2000 cm/s for emitting the laser beam to a direction indicated by an arrow.

The laser crystallization may be conducted by emitting laser beams of a fundamental wave and a harmonic of a continuous wave, or emitting a laser beam of a fundamental wave of a continuous wave and a laser beam of a harmonic of a pulsed laser.

A laser beam may be emitted in the inert gas atmosphere such as noble gas or nitride. According to this, the surface roughness of a semiconductor due to laser beam irradiation, and further, fluctuation in a threshold value due to the variations of interface state density can be prevented.

Figure 3C:
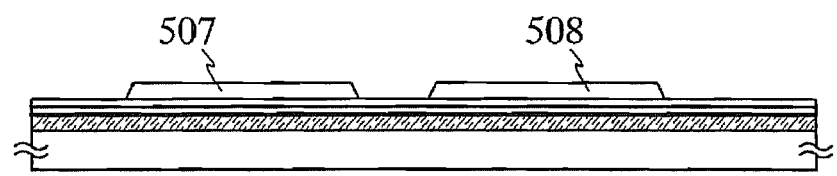

A semiconductor film 506 whose degree of crystallinity is enhanced by the above described laser irradiation on the semiconductor film 505 is formed. Then, as shown in FIG. 3C, the semiconductor film 506 is patterned to form island shape semiconductor films 507 and 508. Various semiconductor elements as typified by a TFT are formed using the island shape semiconductor films 507 and 508. In this embodiment mode, the island shape semiconductor films 507 and 508 are in contact with the base film 504, but an electrode, an insulating film, or the like may be formed between the base film 504 and the island shape semiconductor films 507 and 508 depending on a semiconductor element. For example, in the case of a bottom gate TFT that is one of the semiconductor elements, a gate electrode and a gate insulating film are formed between the base film 504 and the island shape semiconductor films 507 and 508.

Figure 3D:
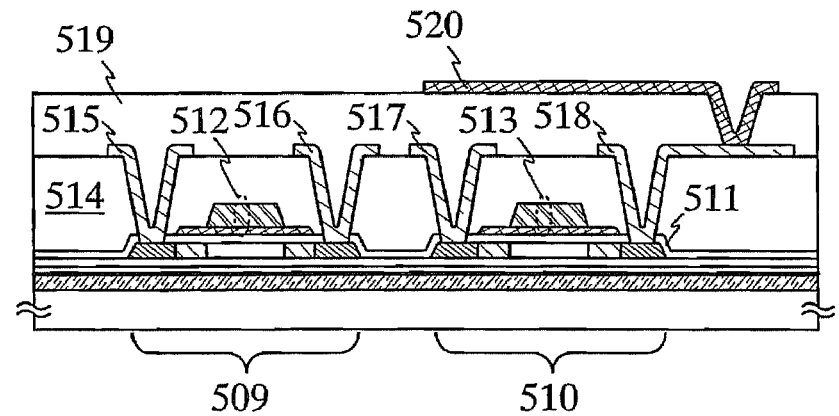

In this embodiment mode, top gate TFTs 509 and 510 are formed using the island shape semiconductor films 507 and 508 (FIG. 3D). Specifically, a gate insulating film 511 is formed so as to cover the island shape semiconductor films 507 and 508. Then, a conductive film is formed over the gate insulating film 511 and patterned, and thus, gate electrodes 512 and 513 are formed. Next, impurities imparting n-type are added to the island shape semiconductor films 507 and 508 by using the gate electrodes 512 and 513 or a resist that is formed and patterned as a mask to form a source region, a drain region, an LDD (Lightly Doped Drain) region and the like. Here, TFTs 509 and 510 are n-type, but impurities imparting p-type are added in the case of using p-type TFTs.

According to the above-described process, TFTs 509 and 510 can be formed. A method for manufacturing the TFTs is not limited to the above-described process.

A first interlayer insulating film 514 is formed so as to cover the TFTs 509 and 510. Contact holes are formed in the gate insulating film 511 and the first interlayer insulating film 514, and then, wirings 515 to 518 connected to the TFTs 509 and 510 through the contact holes are formed so as to be in contact with the first interlayer insulating film 514. A second interlayer insulating film 519 is formed over the first interlayer insulating film 514 so as to cover the wirings 515 to 518.

A contact hole is formed in the second interlayer insulating film 519, and a terminal 520 to connect to the wiring 518 through the contact hole is formed over the second interlayer insulating film 519. In this embodiment mode, the terminal 520 is electrically connected to the TFT 510 through the wiring 518, but the electrical connection between the semiconductor element and the terminal 520 is not limited thereto.

A protective layer 521 is formed over the second interlayer insulating film 519 and the terminal 520. As a material for forming the protective layer 521, a material which can protect the surfaces of the second interlayer insulating film 519 and the terminal 520 and which can be removed after peeling off a second substrate is used, in a later process of bonding or peeling off the second substrate. For example, the protective layer 521 can be formed by coating an epoxy-, acrylate-, or silicon-based resin that is soluble in water or alcohol over the whole surface and baking.

Figure 3E:
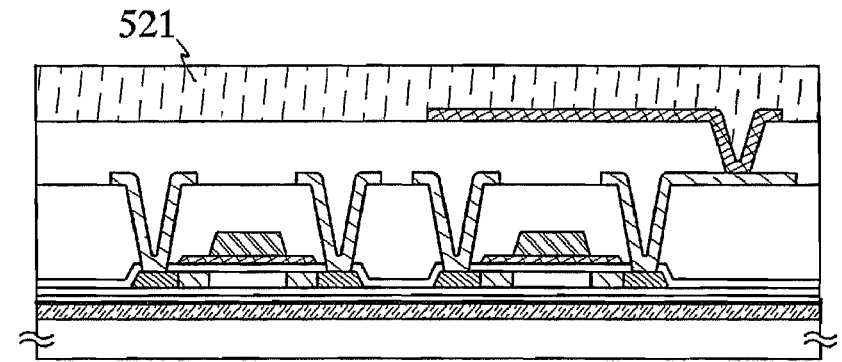

In this embodiment mode, water-soluble resin (TOAG-OSEI Co., Ltd.: VL-WSHL10) is spin-coated to have a thickness of 30 μm, and exposed for two minutes to be pre-cured, then, exposed its back to UV rays for 2.5 minutes, and then, exposed its surface for 10 minutes, namely total 12.5 minutes to be fully cured. Consequently, the protective layer 521 is formed (FIG. 3E).

In the case of stacking a plurality of organic resins, there is a risk of melting partially the stacked organic resins depending on the used solvent during coating or baking, or increasing the adhesion thereof excessively. Therefore, in the case of using both the second interlayer insulating film 519 and the protective layer 521 of organic resins that are soluble in the same solvent, an inorganic insulating film (a $SiN_X$ film, a $SiN_XO_Y$ film, an $AlN_X$ film, or an $AlN_XO_Y$ film) is preferably formed to cover the second interlayer insulating film 519 so as to remove smoothly the protective film 521 in a later process, and be interposed between the second interlayer insulating film 519 and the terminal 520.

The metal oxide film 503 is crystallized for peeling smoothly in a later process. The metal oxide film 503 becomes susceptible to cleave at a grain boundary and its brittleness is enhanced by the crystallization. In this embodiment mode, the crystallization is carried out by heat treatment for approximately from 0.5 hours to 5 hours at temperatures from 420° C. to 550° C.

Then, some treatments are carried out on the metal oxide film 503 in order to make a portion that can spark the start of peeling-off by weakening partly the adhesion between the metal oxide film 503 and the oxide film 502 or the adhesion between the metal oxide film 503 and the metal film 501. Specifically, a part of the inside or a part of the vicinity of the interface of the oxide film 503 is damaged by pressuring locally from outside on the metal oxide film 503 along with the periphery of a region to be separated. Specifically, a hard needle such as a diamond pen may be perpendicularly pressed on the periphery of the edge portion of the metal oxide film 503 and moved along the metal oxide film 503 with applying loading. Preferably, a scriber device can be used to move the pen with applying loading with press force ranging from 0.1 mm to 2 mm. As described above, a portion having weakened adhesion that can spark the start of peeling-off is formed before the peeling-off is preformed, thereby preventing poor peeling-off in a later process of the peeling-off and improving the process yield.

Figure 4A:
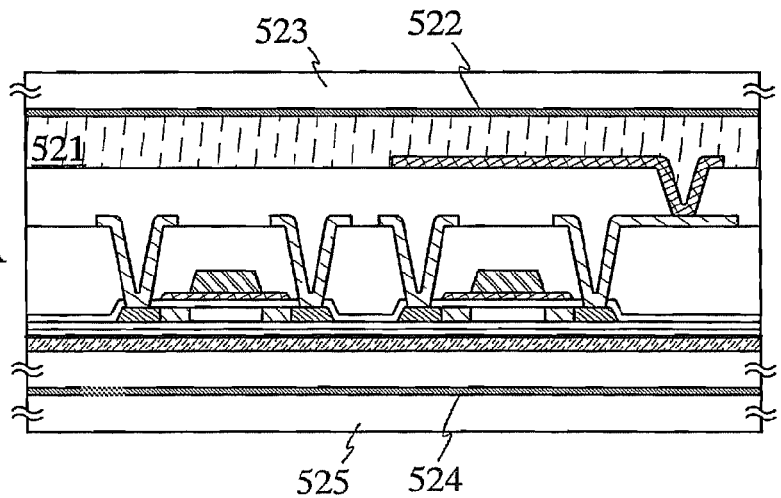
FIGS. 4A to 4C show a method for manufacturing a semiconductor element.

Next, a second substrate 523 is pasted over the protective layer 521 with a two-sided tape 522, and a third substrate 525 is pasted over the first substrate 500 with a two-sided tape 524 (FIG. 4A). An adhesive agent may be used instead of the two-sided tape. For example, it is possible to reduce the load that is applied to the semiconductor element in peeling off the second substrate by using an adhesive agent that is peeled off by UV light. The third substrate 525 prevents the destruction of the first substrate 500 in a later peeling-off process. For the second substrate 523 and the third substrate 525, the substrate that has higher rigidity than that of the first substrate 500, for example, a quartz substrate or a semiconductor substrate is preferably to be used.

Then, the metal film 501 is separated from the oxide film 502 by a physical means. The peeling-off of the metal film 501 is started from the region in which adhesion of the metal oxide film 503 to the metal film 501 or the oxide film 502 is partly weakened in the previous process.

Figure 4B:
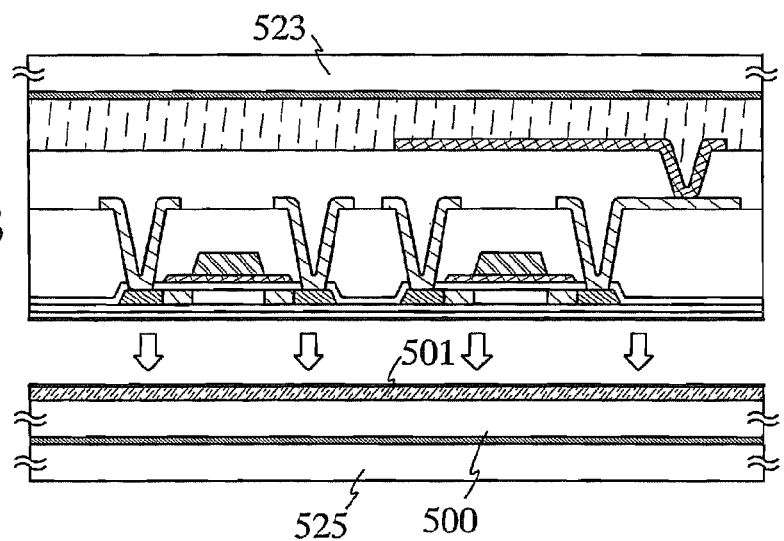

Three separated portions results from the peeling-off of metal film 501, that is, a portion in which the metal film 501 is separated from metal oxide film 503, a portion in which the oxide film 502 is separated from the metal oxide film 503, or a portion in which the metal oxide film 503 is itself separated to two sides. Further, the second substrate 523 on which semiconductor elements (here, TFTs 509 and 510) are pasted is separated from the third substrate 525 on which the first substrate 500 and the metal film 501 are pasted. The peeling-off can be carried out with comparatively small force (for example, man's power, air pressure of gas sprayed from a nozzle, ultrasonic waves, or the like). FIG. 4B shows a state after the peeling-off process.

Figure 4C:
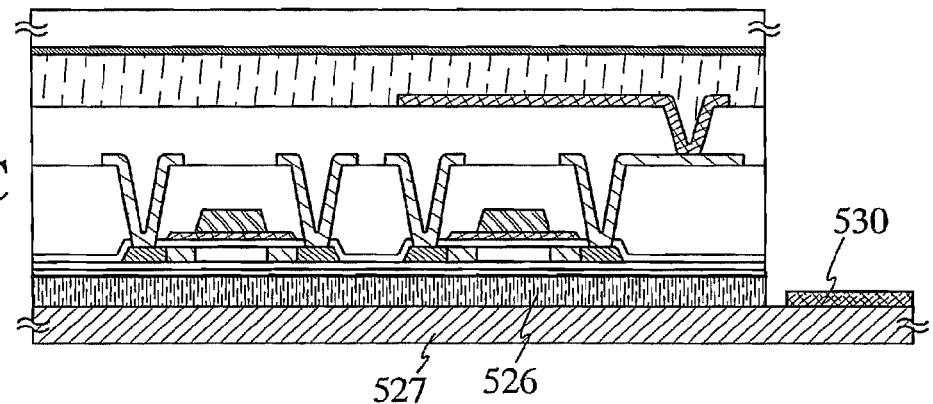

A printed wiring board 527 is bonded to the oxide film 502 to a part of which the metal oxide film 503 is attached with an adhesive agent 526 (FIG. 4C). In this embodiment mode, an example of equipping a thin film integrated circuit for a printed wiring board as a bare chip is described. However, in the case of equipping after packaging, a thin film integrated circuit is mounted over an interposer.

In the adhesive bonding, it is important to select a material for the adhesive agent 526 so that adhesion degree between the oxide film 502 and the printed wiring board 527 by the adhesive agent 526 is higher than that between the second substrate 523 and the protective layer 521 by the two-sided tape 522.

Note that, in some cases, the adhesion with the printed wiring board 527 becomes worse since the metal oxide film 503 is left in a surface of the oxide film 502. For the sake of preventing that, the metal oxide film 503 may be removed completely by etching or the like, and then, bonded to the printed wiring board to enhance the adhesion.

As a material for the printed wiring board 527, a known material such as a ceramic substrate, a glass epoxy substrate, and a polyimide substrate can be used. The material preferably has high thermal conductivity of approximately from 2 W/mK to 30 W/mK for radiating heat generated in a thin film integrated circuit or a display device.

A pad 530 is provided over the printed wiring board 527. The pad 530 is, for example, formed of copper plated with solder, gold, or tin.

As the adhesive agent 526, various curing adhesives such as a photo-curing adhesive, for example, a reaction-curing adhesive, a thermal-curing adhesive, or a UV-curing adhesive, and an anaerobic adhesive can be used. The adhesive agent 526 is preferably given high thermal conductivity by being mixed with powder comprising silver, nickel, aluminum, or aluminum nitride, or filler.

Figure 5A:
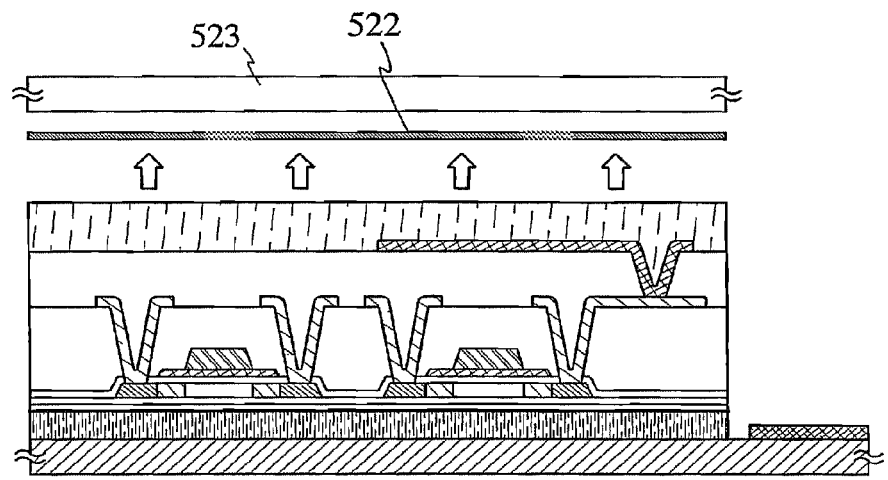
FIGS. 5A to 5C show a method for manufacturing a semiconductor element.

As shown in FIG. 5A, the two-sided tape 522 and the second substrate 523 are separated sequentially or simultaneously from the protective layer 521.

Figure 5B:
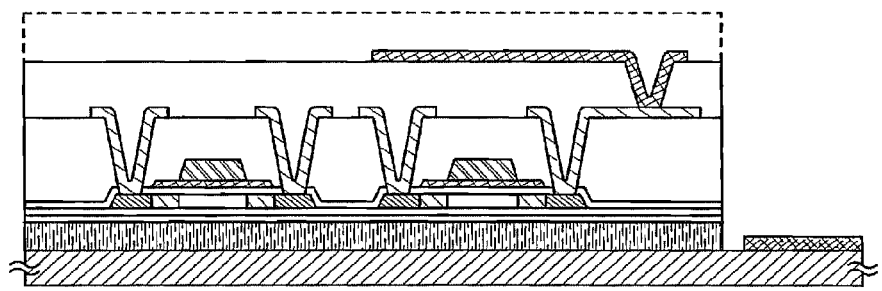

As shown in FIG. 5B, the protective film 521 is removed by water since the protective film 521 is formed of the resin that is soluble in water. In the case where the left protective film 521 causes deterioration, the left protective film 521 is preferably removed by carrying out cleaning treatment or $O_2$ plasma treatment on the surface after the removing process.

Figure 5C:
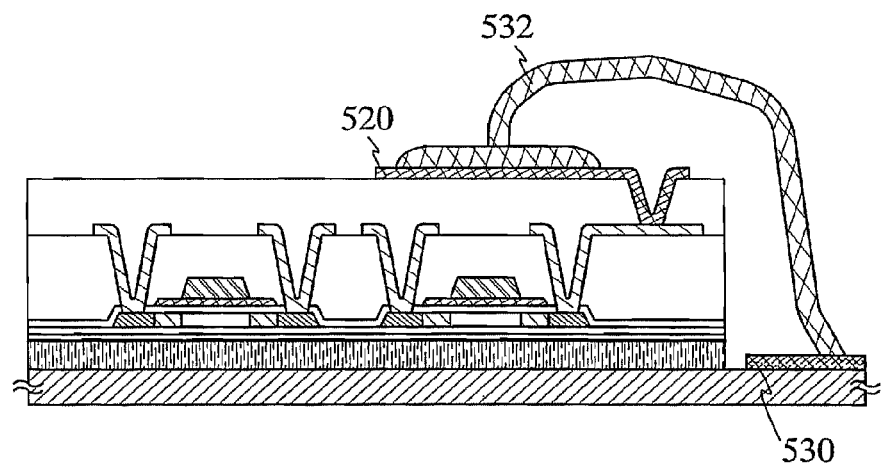

The terminal 520 is connected to the pad 530 with a wire 532 by a wire-bonding method as shown in FIG. 5C. Mounting and electrically connecting are performed to complete the equipment.

Note that, in the case where the thin film integrated circuit is mounted over an interposer, and then packaged, a hermetic sealing manner, plastic molding manner, or the like can be employed for sealing. In the case of using the hermetic sealing manner, a case made of ceramic, metal, glass, or the like is generally used for the sealing. In case of using the plastic molding manner, a mold resin or the like is specifically used. Although it is not always necessary to seal the thin film integrated circuit, the sealing offers some advantages of enhancing strength of the package, radiating heat generated in the thin film integrated circuit, and shielding electromagnetic noises from adjacent circuits.

In this embodiment mode, tungsten is used for the metal film 501, however, the present invention is not limited thereto. Any material can be used as long as the material includes a metal that allows a substrate to be peeled off by forming the metal oxide film 503 over the surface of the material and crystallizing the metal oxide film 503. For example, TiN, WN, Mo or the like as well as W can be used. When alloy of the elements is used as a metal film, the optimum temperature for a heat treatment in crystallization is different depending on the composition ratio thereof. Accordingly, the heat treatment can be performed at a temperature that is not interference in the process for manufacturing a semiconductor element by adjusting the composition ratio, and therefore, there are few limitations in choices for the process for a semiconductor element.

In the laser crystallization, each thin film integrated circuit is formed in a region which is within a width in a direction perpendicular to the scanning direction of a beam spot of laser beam, which prevents the thin film integrated circuits from being exposed to the beam of regions having poor crystallinity (edges) at both end portions of the longitudinal axis of the beam spot. According to this, a semiconductor film having few crystal grain boundaries can be used for a semiconductor element in the thin film integrated circuit.

According to the above-described method, a ultrathin film integrated circuit can be formed to be 1 μm to 5 μm in a total thickness, typically, about 2 μm. The thickness of the thin film integrated circuit includes a thickness of an insulating film provided between the metal oxide film and the semiconductor element, a thickness of an interlayer insulating film to cover the formed semiconductor element, and a thickness of terminals in addition to the thickness of the semiconductor element itself.

Next, a method for manufacturing a display device according to the present invention is described.

Figure 6:
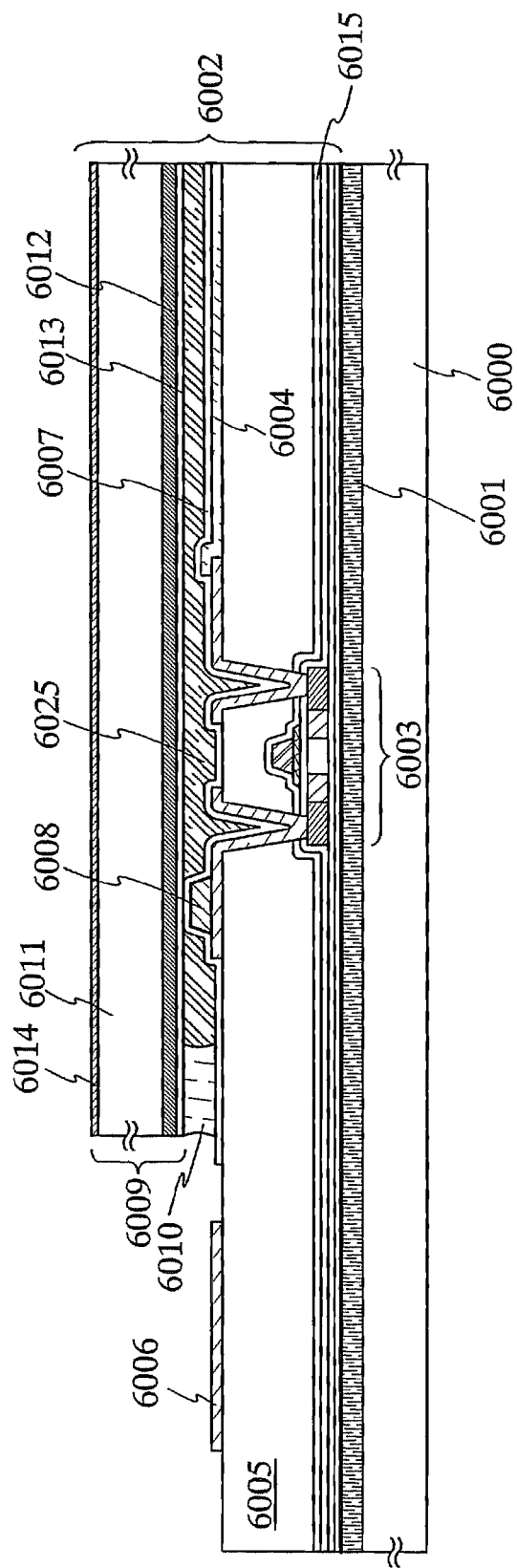
FIG. 6 is a cross-sectional view of a liquid crystal display device.

FIG. 6 shows a cross sectional view showing a display device 6002 which is mounted over a printed wiring board 6000 by an adhesive agent 6001. In FIG. 6, the display device 6002 is a liquid crystal display device as an example.

In the display device 6002 shown in FIG. 6, up to the process for making a semiconductor film is performed according to the method shown in FIG. 3A. A TFT 6003 made by using the semiconductor film, a passivation film 6015 made of an inorganic insulating film, an insulating film 6005 covering the TFT 6003, a pixel electrode 6004 that is electrically connecting to the TFT 6003 and formed over the insulating film 6005, a terminal 6006 for the display device 6002, which is formed over the insulating film 6005, an alignment film 6007 covering the pixel electrode 6004 are formed. The alignment film 6007 is exposed to a rubbing treatment. A spacer 6008 may be formed using an insulating film before the alignment film 6007 is formed. The terminal 6006 is exposed without being covered with the alignment film 6007.

A protective film is formed over the alignment film 6007 according to the method shown in FIG. 3E. The semiconductor element is mounted over the printed wiring board, and the second substrate and the protective film are removed, after peeling off the first substrate according to the processes shown in FIGS. 4A to 4C and FIGS. 5A and 5B.

An opposite substrate 6009 formed separately is bonded to the alignment film 6007 by a sealing material 6010. A filler may be mixed into the sealing material. The opposite substrate 6009 has a structure in which an opposite electrode 6012 comprising a transparent conductive film and an alignment film 6013 exposed to a rubbing treatment are formed over the substrate 6011 having a thickness of about several hundred μm. Further, a color filter or a blocking layer for preventing disclination may be provided for the opposite substrate. A polarization plate 6014 is bonded to a reverse face of the opposite electrode 6012 in the opposite substrate 6009.

A plastic substrate can be used for the substrate 6011. ARTON (manufactured by JSR corporation) comprising a norbornene resin including a polar group can be used for the plastic substrate. Polyethylene terephthalate (PET), polyether sulfone (PES), polyethylene naphthalate (PEN), polycarbonate (PC), nylon, polyetheretherketone (PEEK), polysulfone (PSF), polyetherimide (PEI), polyarylate (PAR), polybutylene telephthalate (PBT), or polyimide can be used for the plastic substrate.

A liquid crystal 6025 is injected and sealed in to complete a display device. The terminal 6006 for the display device 6002 is electrically connected to a lead provided for the printed wiring board 6000 by a wire-bonding method or the like to finish the equipment.

In this embodiment mode, the semiconductor element is mounted over the printed wiring board after peeling off the first substrate in the process for manufacturing the display device. However, the present invention is not limited thereto. Another substrate serving as a base of the display device is provided separately and then, the display device is bonded to the substrate serving as a base, after peeling off the first substrate. The display device together with the substrate serving as a base may be mounted over the printed wiring board. In this case, it is possible to mount the display device over the printed wiring board after the display device is completed. That is, in the case of a liquid crystal display device, it is possible to mount the display device over the printed wiring board after the display device is completed by injecting a liquid crystal and sealing. For example, it is difficult to manufacture a light emitting element that is a display element in a printed wiring board since formations of electroluminescence layer, cathode and the like are included in the case of the light emitting device. Accordingly, it is efficient to mount the display device over a printed wiring board after the display device is completed by using the substrate serving as a base in the case of the light emitting device.

The liquid crystal display device shown in FIG. 6 is reflective type. As long as a backlight can be provided for the liquid display device, it may be a transmissive type. When the reflective liquid crystal display device is used, it is possible to reduce power consumption required for displaying an image more, as compared with a transmissive one. However, when the transmissive liquid crystal display device is used, an image can be seen more easily in the dark, as compared with the reflective one.

The display device of the present invention is required to have a high resolution enough that a person can be recognized with a photograph of the person's face. Therefore, for the sake of using the display device instead of an identification photograph, at least QVGA (320×240) of resolution is to be required.

The printed wiring board is sealed with a sealant after the equipment of the thin film integrated circuit and the display device for the printed wiring board is completed. Materials used generally can be used for sealing the card, for example, polymeric material such as polyester, acrylic acid, polyvinyl acetate, propylene, chloroethene, acrylonitrile-butadiene-styrene resin, or polyethylene terephthalate can be used. When the sealing is performed, the pixel portion of the display device is exposed. In the case of a contact type IC card, the connection terminals as well as the pixel portion are exposed. The IC card having an appearance shown in FIG. 1A can be formed by the sealing.

Figure 7:
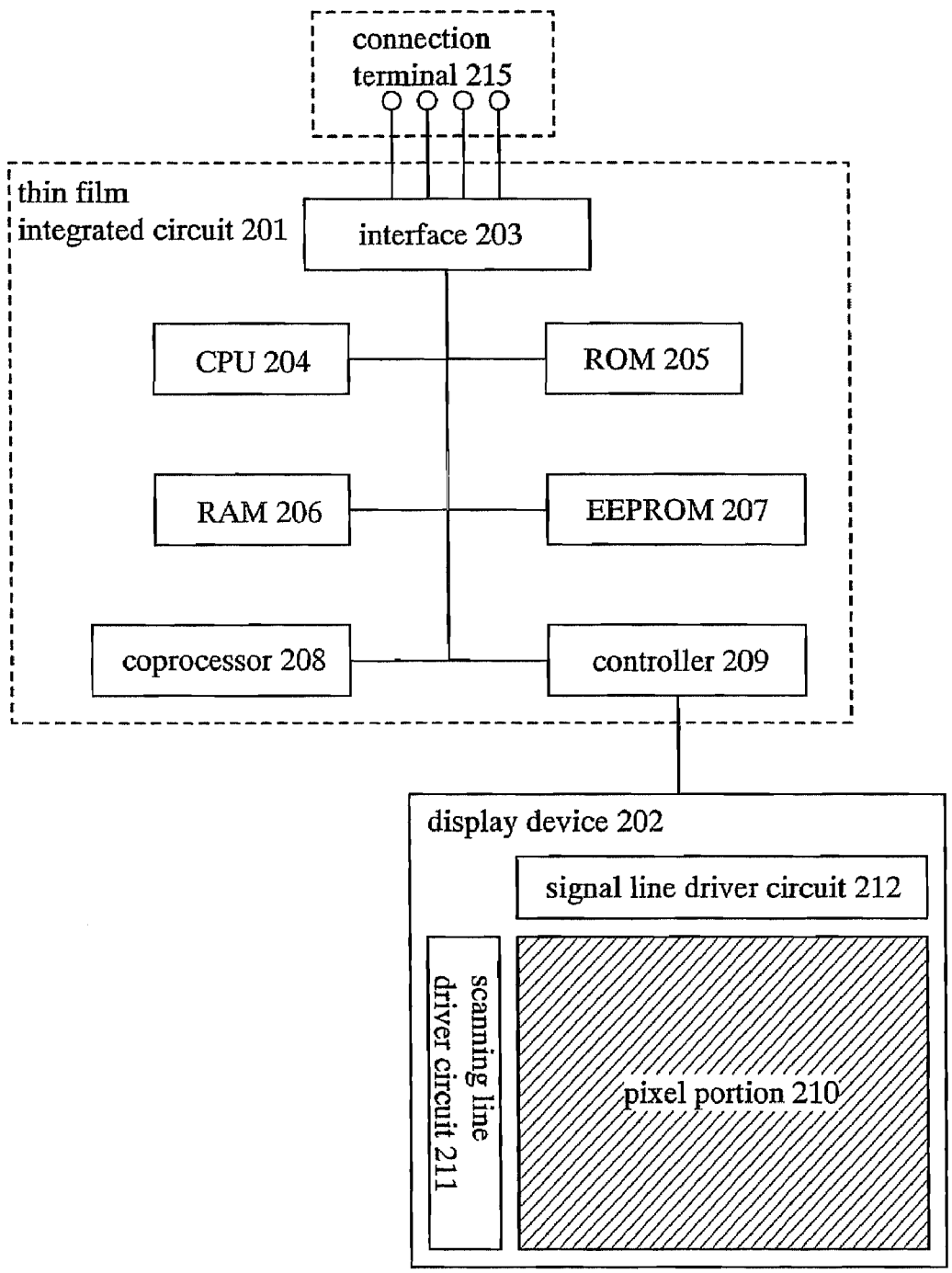
FIG. 7 is a block diagram of a thin film integrated circuit and a display device.

Next, one mode of a thin film integrated circuit and a display device is described. FIG. 7 shows a block diagram of a thin film integrated circuit 201 and a display device 202 mounted over the IC card of the present invention.

Signals are sent and received via an interface 203 provided for the thin film integrated circuit 201 between the thin film integrated circuit 201 and a connection terminal 215 provided for the printed wiring board. A power supply voltage from the connection terminals 215 is supplied to the thin film integrated circuit 201 via the interface 203.

A CPU 204, a ROM 205, a RAM 206, an EEPROM 207, a coprocessor 208, and a controller 209 are provided for the thin film integrated circuit 201 shown in FIG. 7.

All processes of the IC card are controlled by the CPU 2004. Each program used in the CPU 204 is memorized in the ROM 205. The coprocessor 208 is a secondary coprocessor for helping with operation of the main CPU 204. The RAM 206 is used as an operation area during data processing as well as a buffer during a communication of terminal equipment and the thin film integrated circuit film 201. The EEPROM 207 can memorize data inputted as a signal in a determined address.

Note that, image data such as a photograph of a face is memorized in the EEPROM 207 when the data can be rewritten, and in the ROM 205 when the data cannot be rewritten. Alternatively, another memory for memorizing image data may be provided.

A signal including image data is exposed to data processing in accordance with a specification of the display device 202 and supplied to the display device 202 as a video signal by the controller 209. An Hsync signal, Vsync signal, clock signal CLK, and an alternating voltage (AC Cont), etc. are generated based on respective signals or power supply voltage inputted from the connection terminals 215 and are supplied to the display device 202 by the controller 209.

A pixel portion 210 in which a display element is provided for each pixel, a scanning line driver circuit 211 for selecting a pixel provided for the pixel portion 210, and a signal line driver circuit 212 for supplying a video signal to the selected pixel are provided for the display device 202.

The structure, shown in FIG. 7, of the thin film integrated circuit 201 and the display device 202 is one example. The present invention is not limited to the structure. The display device 202 may include a function for displaying an image, and be an active type or a passive type. The thin film integrated circuit 201 may include a function for supplying a signal for controlling the driving of the display device 202 to the display device 202.

It is possible to make changing a photograph of a human face more difficult by displaying data of human face in the display device, as compared with the case of using the printing method. It is also possible to prevent a card forgery and ensure a security of an IC card by memorizing the data of human face in a memory such as ROM in which data cannot be rewritten. Further, more ensured prevention of forgery can be obtained by configuring the card so that ROM is broken when the IC card is tore down forcibly.

A semiconductor film, an insulating film or the like used in a display device is incused with a serial number. If a third person gets illegally an stolen IC card in which image data is not memorized in a ROM, it is possible to trace the distribution route by the serial number to some extent. In this case, it is efficient to incuse a serial number in a part in which the serial number can be deleted, only when the display device is tore down irreparably and cannot be repaired.

The IC card of the present invention is much thinner than that of a thin film integrated circuit manufactured using a silicon wafer, and thus, much more thin film integrated circuit film can be laminated and equipped in the limited area. Accordingly, it is possible to make a circuit scale or memory capacity larger keeping the area of the thin film integrated circuit laid out over a printed wiring board suppressed, thereby making the IC card have a more sophisticated function.

A plastic substrate has a poor heat resistance up to a temperature in the manufacturing process of a semiconductor element, and is difficult to use. However, according to the present invention, a glass substrate, silicon wafer or the like having relatively high heat resistance up to a temperature in the manufacturing process including a heat treatment is used and a semiconductor element can be transported to a plastic substrate, after the manufacturing process is finished. As a result, a plastic substrate that is thinner than a glass substrate or the like can be employed. Although a display device formed over a glass substrate has a thickness of at most 2 mm to 3 mm, a display device can have a thickness of approximately 0.5 mm, preferably 0.02 mm by using a plastic substrate, and thus the display device becomes much thinner dramatically according to the present invention. The display device can be made much thinner, thereby making it possible to provide the thin film integrated circuit and the display device for an IC card and to make the IC card have a highly sophisticated function.

An IC card of the present invention is not limited to a contact type card, but may be a noncontact type card. A structure of an IC card of the present invention is described with reference to FIGS. 8A to 8C.

Figure 8A:
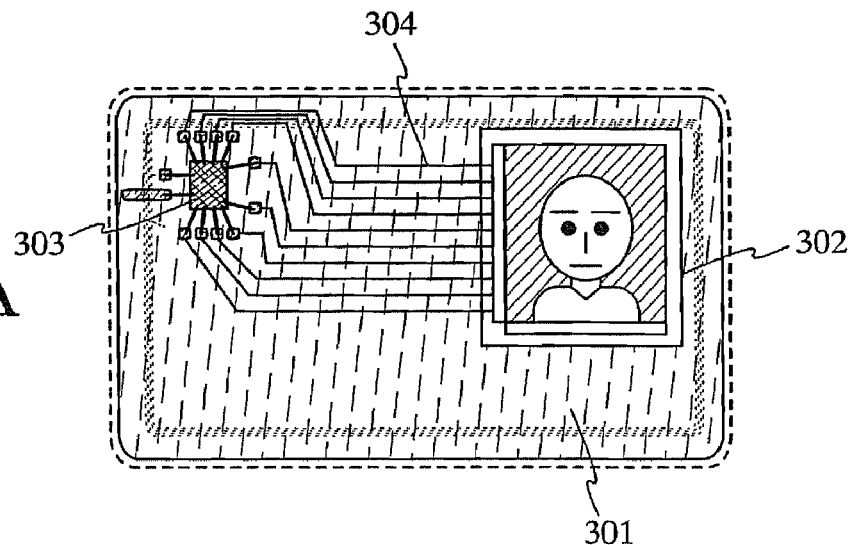
FIGS. 8A to 8C show an internal structure of an IC card according to the present invention.

FIG. 8A shows a structure of a printed wiring board 301 that is sealed in a noncontact type IC card. As shown in FIG. 8A, a display device 302 and a thin film integrated circuit 303 are equipped for the printed wiring board 301, and the display device 302 is electrically connected to the thin film integrated circuit 303 by a lead 304. In FIG. 8A, the thin film integrated circuit 303 and the display device 302 are equipped together for one side of the printed wiring board 301. However, the present invention is not limited thereto. The display device 302 may be equipped for one side the printed wiring board 301, and the thin film integrated circuit 303 may be equipped for the other side thereof.

Figure 8B:
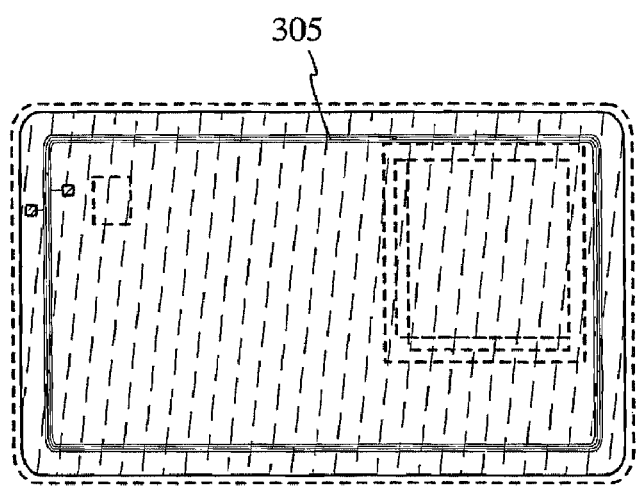

FIG. 8B shows a structure of a backside of the printed wiring board 301 shown in FIG. 8A. As shown in FIG. 8B, an antenna coil 305 is equipped for the printed wiring board 301. Sending and receiving data between the thin film integrated circuit 303 and a terminal equipment can be performed using electromagnetic induction by the antenna coil 305 without having a contact. As a result, the IC card is suffered from less physical wear or damage than a contact type IC card.

FIG. 8B shows an example of using the printed wiring board 301 incorporating the antenna coil 305. However, an antenna coil that is made separately may be equipped for the printed wiring board 301. For example, copper wire is wound in coil form and sandwiched between two plastic films having a thickness of about 100 μm and pressed, which can be used as an antenna coil.

Figure 8C:
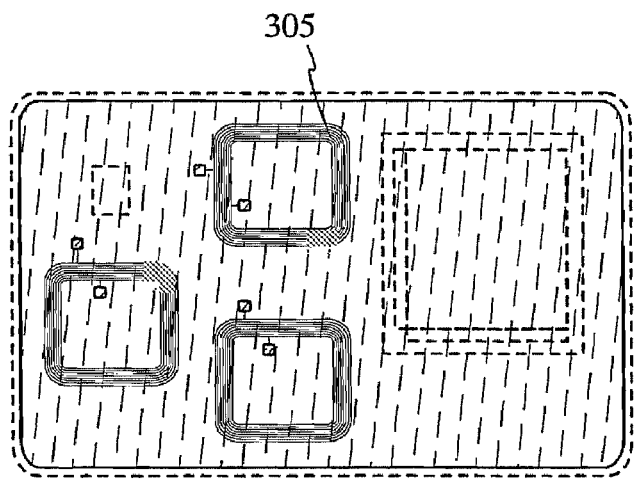

In FIG. 8B, one antenna coil 305 is used for one IC card. However, a plurality of antenna coils 305 may be used as shown in FIG. 8C.

Figure 9:
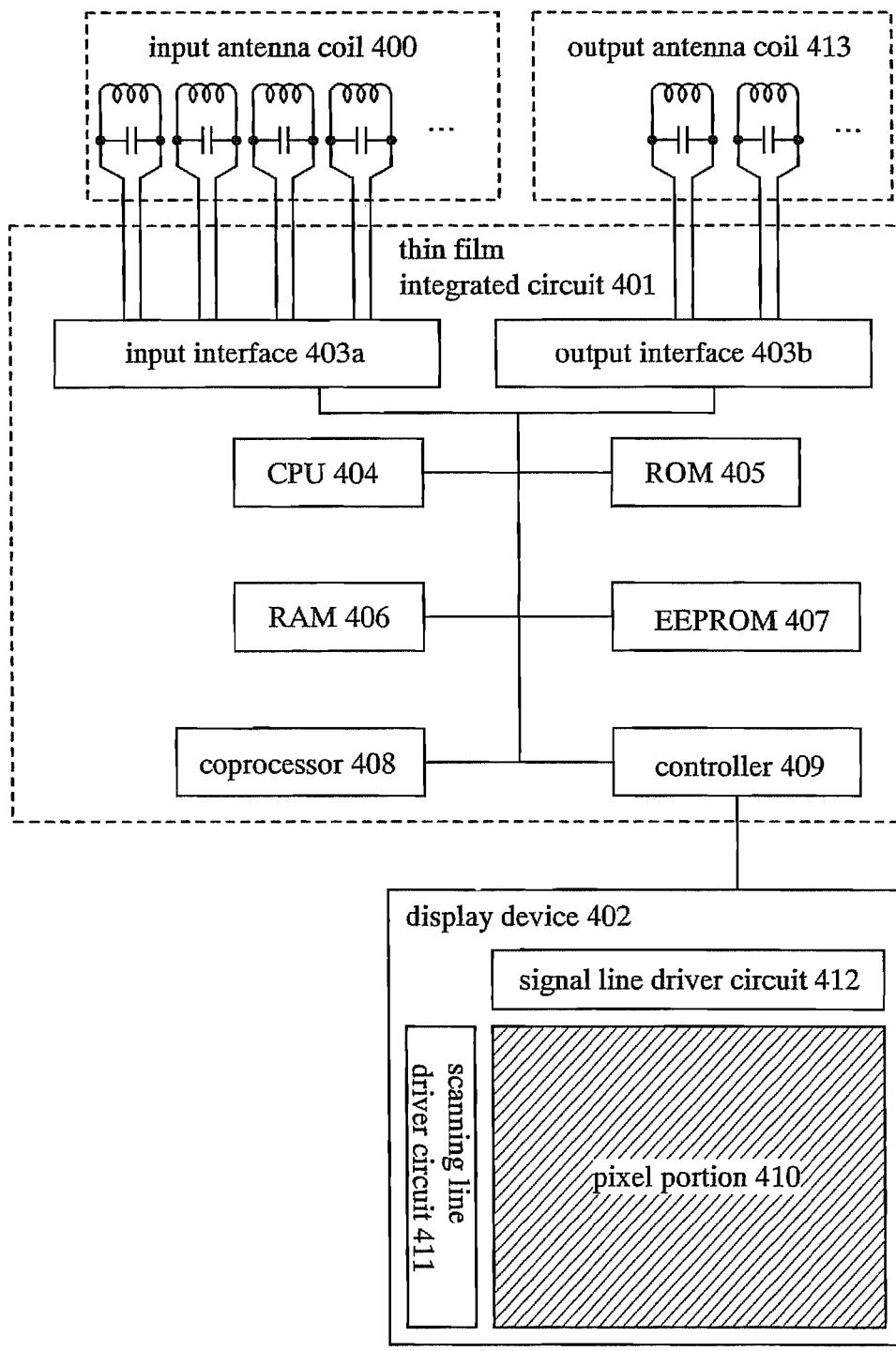
FIG. 9 is a block diagram of a thin film integrated circuit and a display device.

Next, one mode of a structure of a thin film integrated circuit and a display device in a noncontanct-type IC card is described. FIG. 9 shows a block diagram of a thin film integrated circuit 401 and a display device 402 that are provided for an IC card of the present invention.

Reference number 400 denotes an input antenna coil, 413 denotes an output antenna coil. 403a denotes an input interface, 403b denotes an output interface. It is noted that the number of each antenna coil is not limited to the number shown in FIG. 9.

A CPU 404, a ROM 405, a RAM 406, an EEPROM 407, a coprocessor 408, and a controller 409 are provided for the thin film integrated circuit 401 shown in FIG. 9, as the case of FIG. 7. A pixel portion 410, a scanning line driver circuit 411, and a signal line driver circuit 412 are provided for the display device 402.

AC power supply voltage or various signals inputted from a terminal equipment by the input antenna coil 400 are waveform-shaped or made a direct current in the input interface 403a, and then supplied to each circuit. An output signal outputted from the thin film integrated circuit 401 is modulated in the output interface 403b, and sent to the terminal equipment by the output antenna coil 413.

Figure 10A:
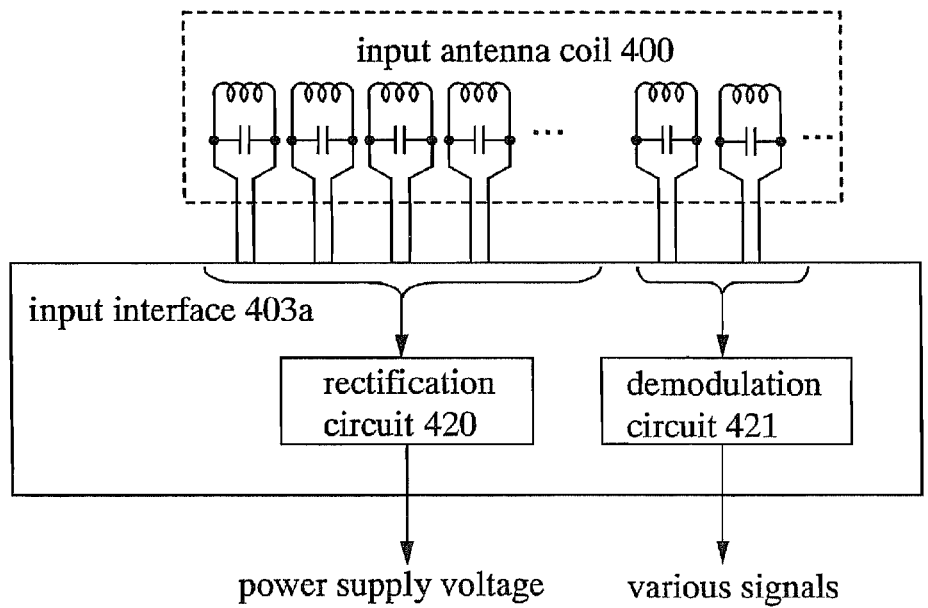
FIGS. 10A and 10B are block diagrams showing structures of an input interface and an output interface.

FIG. 10A shows a more detailed structure of the input interface 403a. A rectification circuit 420 and a demodulation circuit 421 are provided for the input interface 403a shown in FIG. 10A. AC power supply voltage inputted from the input antenna coil 400 is rectified in the rectification circuit 420 and supplied to each circuit within the thin film integrated circuit 401 as DC power supply voltage. Each of AC signals inputted from the input antenna coil 400 is demodulated in the demodulation circuit 421 and supplied to each circuit within the thin film integrated circuit 401.

Figure 10B:
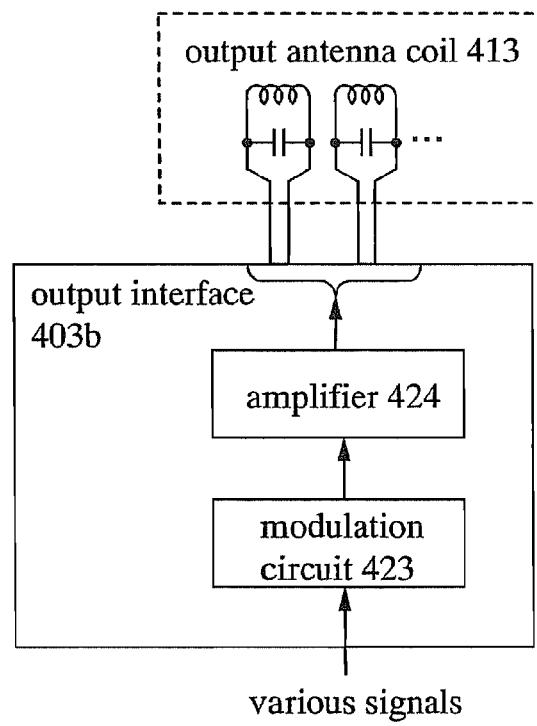

FIG. 10B shows a more detailed structure of the output interface 403b. A modulation circuit 423 and an amplifier 424 are provided for the output interface 403b shown in FIG. 10B. Various signals that are inputted to the output interface 403b from each circuit within the thin film integrated circuit 401 are modulated in the modulation circuit 423, amplified or buffer-amplified in the amplifier 424, and then, sent to the terminal equipment from the output antenna coil 413.

In this embodiment mode, an example of a noncontact type using a coil antenna is shown. However, the noncontact type IC card is not limited thereto. A light emitting element, an optical sensor or the like may be used for sending and receiving data.

Further, in this embodiment mode, an example of supplying a power supply voltage from a reader/writer by an antenna coil or a connection terminal. However, the present invention is not limited thereto. For example, an ultrathin type battery such as a lithium battery may be incorporated, or a solar battery may be provided.

As described above, a less expensive and larger glass substrate than a silicon wafer can be used in the present invention, thereby mass-producing thin film integrated circuits at lower cost and with higher throughput, and reducing the manufacturing cost extremely. A substrate can be used repeatedly, and thus the cost can be reduced.

According to the present invention, it is possible to provide a larger number of thin film integrated circuits having a larger memory capacity or a larger circuit scale within the limited area, since a thin film integrated circuit that is extremely thin can be formed according to the present invention. The formed display device can be thin enough to be provided for the IC card that is from 0.05 mm to 1 mm thick. Accordingly, it is possible to realize multi-functionality of the IC card without preventing an IC card from becoming smaller and lighter.

A thin film integrated circuit or a display device can be bonded in accordance with a shape of a printed wiring board, and thus, there is a lot of flexibility for a shape of an IC card. Therefore, for example, it is possible to form an IC card into a shape having a curved surface, which can be attached to a columnar bottle.

Embodiments

Hereinafter, embodiments of the present invention are described.

Embodiment 1

In this embodiment, electrical connection between an interposer provided for a contact type IC card and a thin film integrated circuit is described.

Figure 11A:
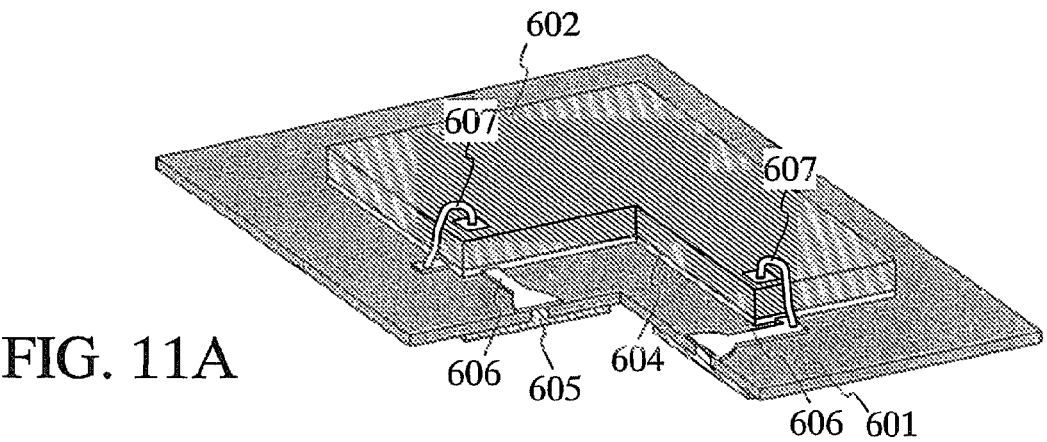
FIGS. 11A to 11D are cross-sectional views showing a structure of a thin film integrated circuit.

FIG. 11A is an oblique perspective figure showing a cross-sectional structure of the thin film integrated circuit connected to the interposer by a wire-bonding method. Reference number 601 denotes an interposer, 602 denotes a thin film integrated circuit. The thin film integrated circuit 602 is mounted over the interposer 601 by an adhesive agent 604 for mounting.

A connection terminal 605 is provided for a reverse side of the face over which the thin film integrated circuit 602 is mounted in the interposer 601 shown in FIG. 11A. A pad 606 provided for the interposer 601 is electrically connected to the connection terminal 605 via a contact hole provided for the interposer 601.

In this embodiment, the connection terminal 605 is electrically connected to the pad 606 directly through the contact hole. However, for example, multi-layered wirings may be provided within the interposer 601 and the electrical connection may be conducted by the wirings.

Figure 11B:
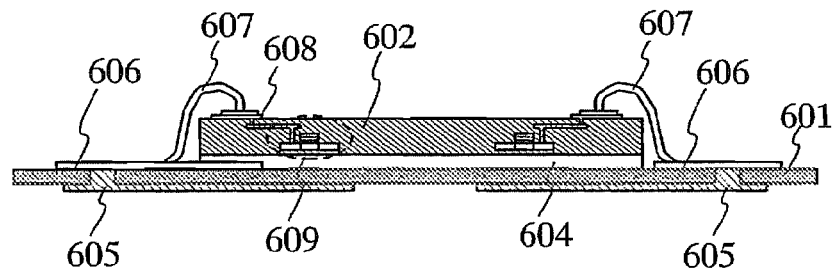

In FIG. 11A, the thin film integrated circuit 602 is electrically connected to the pad 606 by a wire 607. FIG. 11B is a cross sectional view of a package shown in FIG. 11A. A semiconductor element 609 is provided for the thin film integrated circuit 602. A pad 608 for the thin film integrated circuit is provided for the side opposite to the side of the thin film integrated circuit 602 for which the interposer 601 is provided. The pad 608 is electrically connected to the semiconductor element 609. The pad 608 for the thin film integrated circuit is electrically connected to the pad 606 formed over the interposer 601 by the wire 607.

Figure 11C:
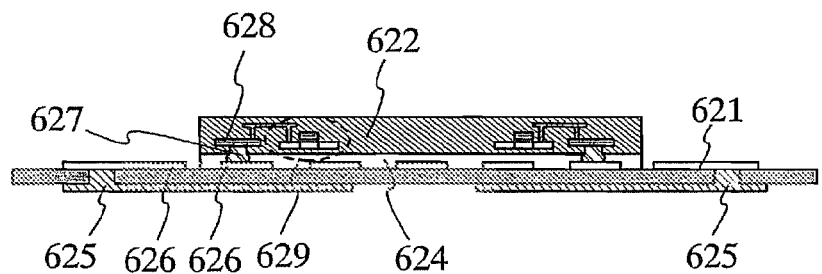

FIG. 11C is a cross sectional view of the thin film integrated circuit that is connected to the interposer by a flip chip method. A solder ball 627 is provided for a thin film integrated circuit 622 in a package shown in FIG. 11C. The solder ball 627 is provided for the side of the interposer 621 of the thin film integrated circuit 622, and connected to a pad 628 similarly provided for the thin film integrated circuit 622. A semiconductor element 629 provided for the thin film integrated circuit 622 is connected to the pad 628. When a TFT is used as the semiconductor element 629, the pad 628 may be formed of the same conductive film as that of a gate electrode of the TFT.

The solder ball 627 is connected to the pad 626 provided for the interposer 621. In FIG. 11C, an underfilling 624 is provided to fill a space between the solder balls 627. A connection terminal 625 of the interposer 621 is provided for the side opposite to the side over which the thin film integrated circuit 622 of the interposer 621 is mounted. The pad 626 provided for the interposer 621 is electrically connected to the connection terminal 625 through a contact hole provided for the interposer 621.

The flip chip method is suitable for a connection of a thin film integrated circuit having a lot of terminals, since a pitch between pads is kept wider relatively than when a wire bonding method is employed, even if the number of pads to be connected increases.

Figure 11D:
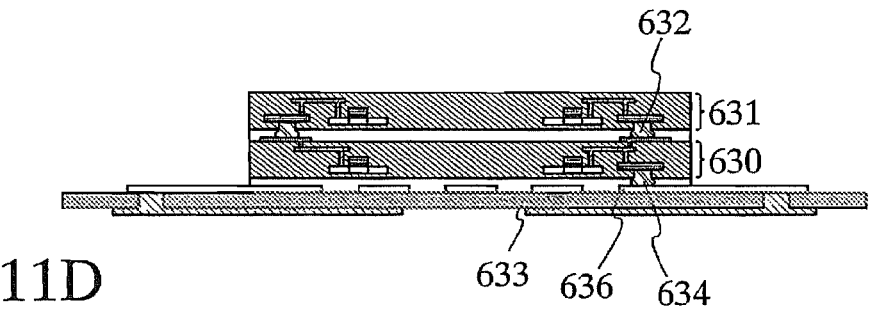

FIG. 11D is a cross sectional view of a thin film integrated circuit laminated by a flip chip method. Two thin film integrated circuits 630 and 631 are laminated over an interposer 633 in FIG. 11D. A pad 636 provided for the interposer 633 is electrically connected to the thin film integrated circuit 630 with a solder ball 634. The thin film integrated circuit 631 is also electrically connected to the thin film integrated circuit 630 with a solder ball 632.

FIGS. 11A to 11D show an example of mounting the thin film integrated circuits over the interposer as a bare chip. In the present invention, the thin film integrated circuits may be packaged and then, mounted over the interposer. In this case, the electrical connection between the thin film integrated circuit and the interposer may be conducted with a solder ball, a wire, or the combination of the both.

For the method of connecting the solder ball and the pad, various methods such as thermocompression or thermocompression added with ultrasonic vibration can be used. An underfilling may be provided to fill gaps between solder balls after the thermocompression for enhancing the mechanical strength of connecting portion and the coefficient of thermal diffusivity of heat generated in the package. The underfilling, although it is not always necessary to be used, can prevent poor electrical connection due to stress caused by the mismatch coefficient of thermal expansion of a printed wiring board or the interposer and the thin film integrated circuit. In the case of bonding by thermocompression added with ultrasonic vibration, poor electrical connection can be prevented compared with the case of bonding solely by thermocompression. Especially, it is efficient for the case where a connection point between the thin film integrated circuit and the printed wiring board or the interposer are more than 100.

Embodiment 2

In this embodiment, a specific example of using an IC card of the present invention as an ATM card is described.

Figure 12:
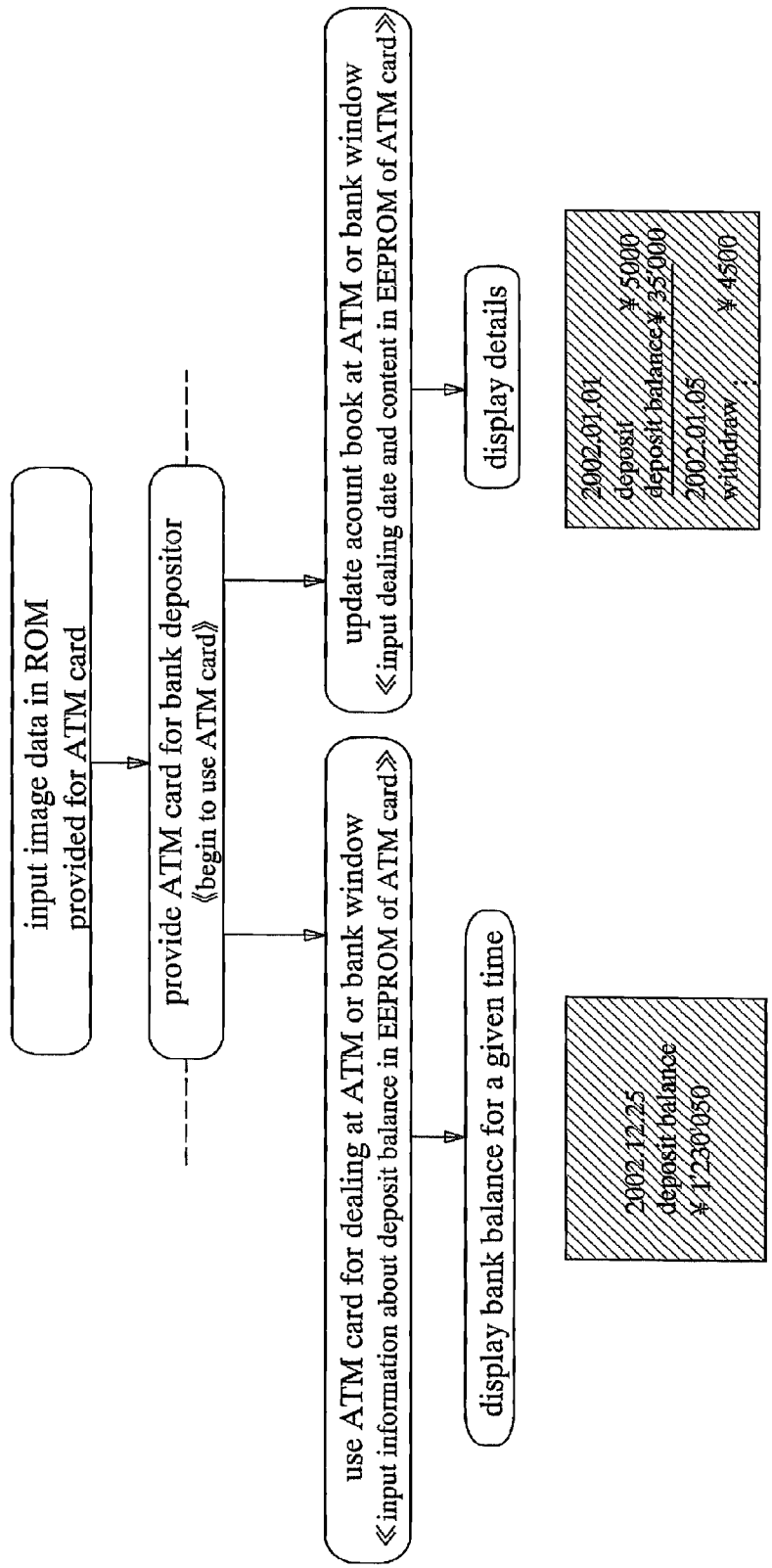
FIG. 12 shows how to use an IC card of the present invention.

As shown in FIG. 12, image data of a bank depositor's face is memorized in a ROM provided for a thin film integrated circuit of an ATM card when he/she opens an account in a financial institution such as a bank. Forgery such as changing the photograph of a human face can be prevented by memorizing the data thereof in the ROM. The ATM card is provided for the bank depositor, and then he/she can begin to use the ATM card.

An ATM card is used for dealings at an ATM (automated teller machine) or a window. When dealing such as withdrawing, depositing, or transferring cash is done, details such as deposit balance or dealing date is required to be memorized in an EEPROM provided for a thin film integrated circuit of an ATM card.

After the dealing, details such as deposit balance or dealing date may be displayed in a pixel portion of the ATM card, and the display may be programmed to vanish after a given time. During the dealing, a payment such as an automatic draft from an account by transferring cash automatically that is performed without an ATM card may be entered-account using the IC card and confirmed in the pixel portion.

Before a payment is performed directly from an account without dealing in cash using a bank ATM card like a debit card (R), information about a bank balance is got out from a host computer of a bank by using a terminal equipment used in the payment, and the information of the bank balance may be displayed in the pixel portion of the IC card. When the bank balance is displayed with the terminal equipment, there is a risk of someone's steeling a glance at it from behind. However, an IC card user can confirm the bank balance without being stolen glance at, by displaying the bank balance in the pixel portion of the IC card. Since it is possible to confirm the bank balance with terminal equipment for payment placed in a shop, troublesome chores such as balance inquiry and account book updating at a bank window or ATM can be avoided.

An IC card of the present invention is not limited to an ATM card. The IC card of the present invention may be applied to a train pass or a prepaid card, and information about remaining balance may be displayed in a pixel portion.

Embodiment 3

In this embodiment, a case in which a plurality of liquid crystal display devices is manufactured from one substrate is described.

Figure 13A:
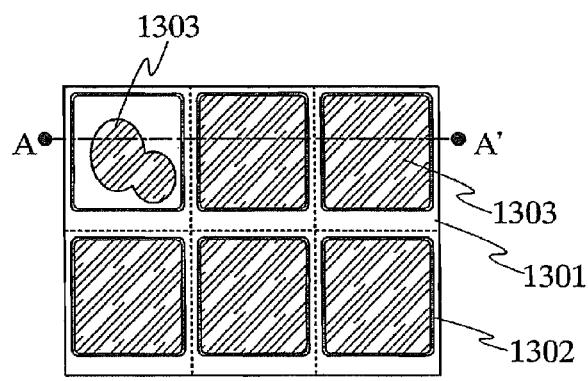
FIGS. 13A to 13F show a method for manufacturing a display device according to the present invention.

FIG. 13A is a top view of a substrate when a plurality of liquid crystal display devices is manufactured at the same time over a first substrate 1301. A sealing material 1302 to surround an area in which a liquid crystal is to be sealed is laid out and formed over the first substrate 1301 over which an alignment film is formed. A liquid crystal 1303 is dripped to the area surrounded by the sealing material 1302.

Figure 13B:
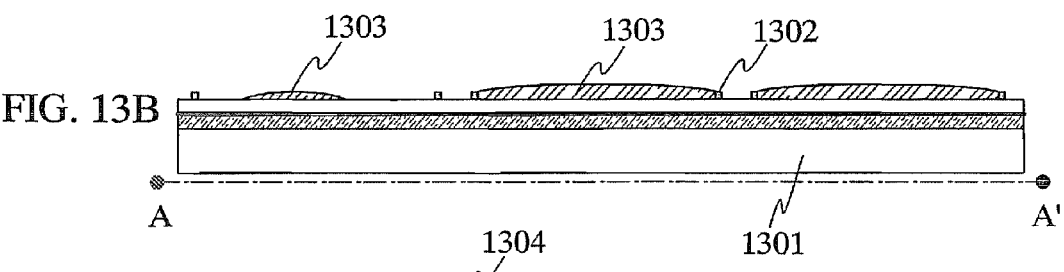
Figure 13C:
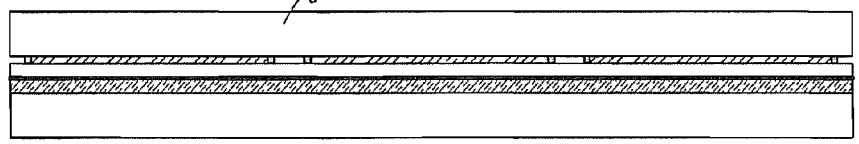

FIG. 13B is a cross sectional view along a broken line A-A' in FIG. 13A. As shown in FIG. 13B, the liquid crystal 1303 is dripped to the area surrounded by the sealing material 1302. Next, as shown in FIG. 13C, an opposite substrate 1304 is pressure-bonded so that the liquid crystal 1303 can be sealed within the area surrounded by the sealing material 1302.

Figure 13D:
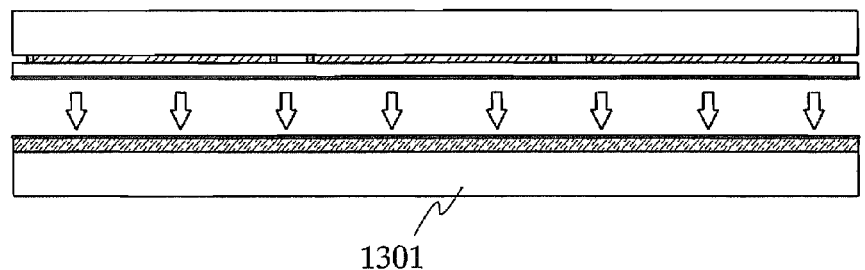
Figure 13E:
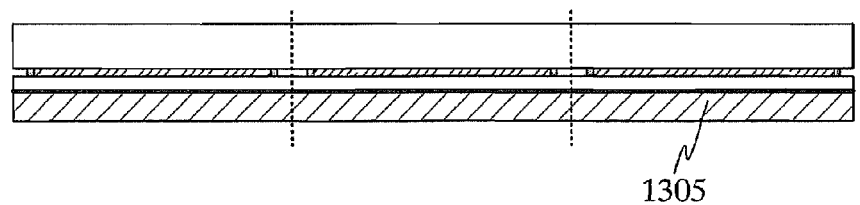
Figure 13F:

After pressure-bonding the opposite substrate, as shown in FIG. 13D, the first substrate 1301 is peeled off and removed. After that, a plastic substrate 1305 is bonded as shown in FIG. 13E. Dicing is performed in a position of a dotted line, and then display devices are separated from one another as shown in FIG. 13F.

In this embodiment, a case of a liquid crystal display device is described. However, the present invention is not limited thereto. A plurality of light emitting devices or other display devices can be manufactured at the same time.

Figure 14A:
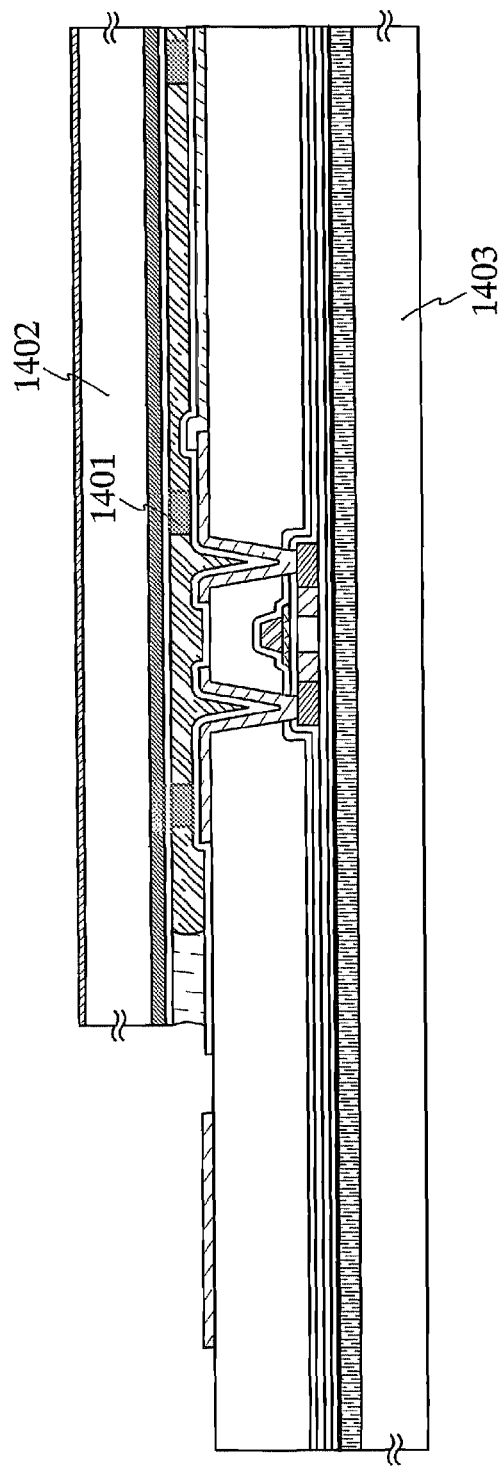
FIGS. 14A and 14B are cross-sectional views of a liquid crystal display device.
Figure 14B:
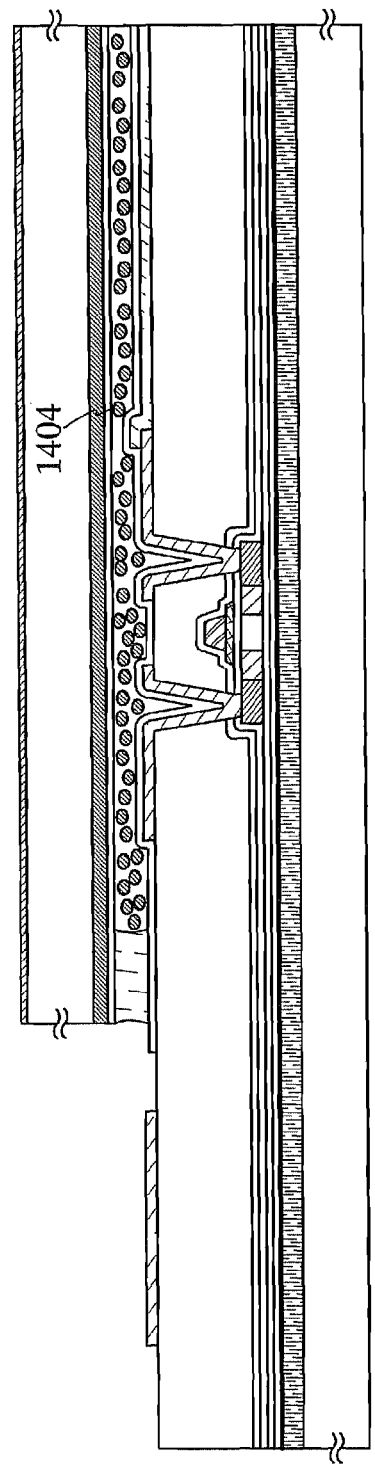

FIGS. 14A and 14B are cross sectional views of a liquid crystal display of this embodiment. A columnar spacer 1401 is provided for a pixel in a liquid crystal display device shown in FIG. 14A. Adhesion between an opposite substrate 1402 and a substrate 1403 on the side of elements is enhanced by the columnar spacer 1401. This makes it possible to prevent a semiconductor element in the outside of the area overlapping with a sealing material from remaining on the side of the first substrate, when the first substrate is peeled off.

FIG. 14B is a cross sectional view of a liquid crystal display device using nematic liquid crystal, smectic liquid crystal, ferroelectric liquid crystal, or PDLC (polymer dispersed liquid crystal) in which the above described liquid crystal is included in polymer resin. Adhesion between the opposite substrate 1402 and the substrate 1403 on the side of elements is enhanced by PDLC 1404. This makes it possible to prevent a semiconductor element in the outside of the area overlapping with a sealing material from remaining on the side of the first substrate, when the first substrate is peeled off.

As described above, a glass substrate that is less expensive and larger than a silicon wafer can be used, and thus, thin film integrated circuits can be mass-produced at lower cost and with higher throughput according to the present invention. As a result, a manufacturing cost can be reduced dramatically. Further, it is possible to use a substrate repeatedly, thereby reducing the cost.

According to the present invention, a thin film integrated circuit that is ultrathin can be manufactured. It is also possible to provide a larger number of thin film integrated circuits having a larger memory capacity or a larger circuit scale within the limited area. A display device can be formed to be thin enough to be provided for an IC card having a thickness of from 0.05 mm through 1 mm. Accordingly, multi-functionality of the IC card can be realized without preventing an IC card from becoming smaller and lighter.

A thin film integrated circuit or a display device can be bonded in accordance with a shape of a printed wiring board, and thus, there is a lot of flexibility for a shape of an IC card. Therefore, for example, it is possible to form an IC card into a shape having a curved surface, which can be attached to a columnar bottle.

What is claimed is:

1. A method for manufacturing an article comprising:
   forming a metal film over a substrate;
   forming a metal oxide film by oxidizing a surface of the metal film;
   selectively removing the metal film formed in an edge portion of the substrate;
   forming a base film over the metal oxide film;
   forming a semiconductor element over the base film; and
   separating the semiconductor element and the base film from the substrate by physical means.

2. The method for manufacturing the article according to claim 1, further comprising forming an insulating film on the substrate.

3. The method for manufacturing the article according to claim 1, wherein the metal film includes tungsten.

4. The method for manufacturing the article according to claim 1, wherein the semiconductor element comprises a thin film transistor.

5. The method for manufacturing the article according to claim 1, wherein the semiconductor element comprises a memory element.

6. The method for manufacturing the article according to claim 1, wherein the article is a card having a thickness of from 0.05 mm to 1 mm.

7. The method for manufacturing the article according to claim 1, wherein the article further comprises an antenna.

8. A method for manufacturing an article comprising:
   forming a metal film over a substrate;
   forming a metal oxide film by oxidizing a surface of the metal film;
   selectively removing the metal film formed in an edge portion of the substrate;
   forming a base film over the metal oxide film;
   forming a semiconductor element over the base film;
   forming a pixel electrode electrically connected to the semiconductor element; and
   separating the pixel electrode, the semiconductor element and the base film from the substrate by physical means.

9. The method for manufacturing the article according to claim 8, further comprising forming an insulating film on the substrate.

10. The method for manufacturing the article according to claim 8, wherein the metal film includes tungsten.

11. The method for manufacturing the article according to claim 8, wherein the semiconductor element comprises a thin film transistor.

12. The method for manufacturing the article according to claim 8, wherein the article is a card having a thickness of from 0.05 mm to 1 mm.

13. The method for manufacturing the article according to claim 8, wherein the article further comprises an antenna.

14. The method for manufacturing the article according to claim 8, wherein the article is a display device.

15. The method for manufacturing the article according to claim 14, wherein the display device is a liquid crystal display device.

16. A method for manufacturing an article comprising:
   forming a metal film over a substrate;
   forming an oxide film over the metal film wherein a metal oxide film is formed between the metal film and the oxide film;
   selectively removing the metal film formed in an edge portion of the substrate;
   forming a base film over the metal oxide film;
   forming a semiconductor element over the base film;
   forming a pixel electrode electrically connected to the semiconductor element; and
   separating the pixel electrode, the semiconductor element and the base film from the substrate by physical means.

17. The method for manufacturing the article according to claim 16, further comprising forming an insulating film on the substrate.

18. The method for manufacturing the article according to claim 16, wherein the metal film includes tungsten.

19. The method for manufacturing the article according to claim 16, wherein the semiconductor element comprises a thin film transistor.

20. The method for manufacturing the article according to claim 16, wherein the article is a card having a thickness of from 0.05 mm to 1 mm.

21. The method for manufacturing the article according to claim 16, wherein the article further comprises an antenna.

22. The method for manufacturing the article according to claim 16, wherein the article is a display device.

23. The method for manufacturing the article according to claim 22, wherein the display device is a liquid crystal display device.

* * * * *

UNITED STATES PATENT AND TRADEMARK OFFICE
CERTIFICATE OF CORRECTION

PATENT NO.         : 8,158,491 B2                        Page 1 of 1
APPLICATION NO.    : 12/979052
DATED              : April 17, 2012
INVENTOR(S)        : Toru Takayama et al.

It is certified that error appears in the above-identified patent and that said Letters Patent is hereby corrected as shown below:

At column 1, line 43, "Japanese Examined Patent" should be --Japanese Examined Patent Publication No. H02-7105).--.

Signed and Sealed this
Twelfth Day of March, 2013

Teresa Stanek Rea
*Acting Director of the United States Patent and Trademark Office*